(12) United States Patent
Keegan et al.

(10) Patent No.: US 8,393,678 B2
(45) Date of Patent: Mar. 12, 2013

(54) INFANT CHILD RESTRAINT SYSTEM

(75) Inventors: Charles H. Keegan, Milton, MA (US);
Phillip A. Przybylo, Waxhaw, NC (US);
William Henderson, Holden, MA (US)

(73) Assignee: Goodbaby Child Product Co., Ltd., Jiangsu Province (CN)

( * ) Notice: Subject to any disclaimer, the term of this patent is extended or adjusted under 35 U.S.C. 154(b) by 123 days.

(21) Appl. No.: 12/971,216

(22) Filed: Dec. 17, 2010

(65) Prior Publication Data
US 2011/0169310 A1    Jul. 14, 2011

Related U.S. Application Data

(60) Provisional application No. 61/288,579, filed on Dec. 21, 2009.

(51) Int. Cl.
*A47D 1/10* (2006.01)
*B60N 2/26* (2006.01)

(52) U.S. Cl. .................................................. 297/256.16
(58) Field of Classification Search .............. 297/256.16
See application file for complete search history.

(56) References Cited

U.S. PATENT DOCUMENTS

| | | | | |
|---|---|---|---|---|
| 4,943,113 A * | 7/1990 | Meeker | .................... | 297/256.16 |
| 5,385,387 A * | 1/1995 | Kain | ....................... | 297/256.16 |
| 5,478,135 A * | 12/1995 | Kain | ....................... | 297/256.16 |
| 5,564,778 A * | 10/1996 | Shimer et al. | ........ | 297/256.16 X |
| 5,567,008 A * | 10/1996 | Cone, II | .................... | 297/256.16 |
| 5,997,086 A * | 12/1999 | Gibson et al. | ............ | 297/256.16 |
| 6,017,088 A | 1/2000 | Stephens et al. | | |
| 6,106,057 A | 8/2000 | Lee | | |
| 6,183,044 B1 * | 2/2001 | Koyanagi et al. | ........ | 297/256.16 |
| 6,299,249 B1 | 10/2001 | Mori | | |
| 6,347,832 B2 | 2/2002 | Mori | | |
| 6,607,243 B2 | 8/2003 | Kain | | |
| 6,669,288 B2 * | 12/2003 | Nakagawa et al. | ...... | 297/256.16 |
| 6,979,057 B2 | 12/2005 | Sedlack | | |
| 7,404,593 B2 | 7/2008 | Cormier et al. | | |
| 7,484,801 B2 * | 2/2009 | Kassai et al. | ............. | 297/256.16 |
| 7,506,926 B2 | 3/2009 | Carine | | |
| 7,597,396 B2 * | 10/2009 | Longenecker et al. | .................... | 297/256.16 X |
| 7,658,446 B2 * | 2/2010 | Meeker et al. | ........ | 297/256.16 X |
| 8,186,757 B2 * | 5/2012 | Duncan et al. | ........ | 297/256.16 X |
| 8,226,164 B2 * | 7/2012 | Chen | .................... | 297/256.16 X |
| 2002/0074840 A1 * | 6/2002 | Nakagawa et al. | ...... | 297/256.16 |
| 2003/0209926 A1 * | 11/2003 | Nakagawa et al. | ...... | 297/256.16 |
| 2004/0169406 A1 | 9/2004 | Yoshida | | |
| 2004/0207243 A1 * | 10/2004 | Sedlack | ................... | 297/256.16 |

(Continued)

OTHER PUBLICATIONS

SAE International (2008); 09B-0334; William Van Arsdell et al.; "Effect of Padding on Child Restraint Performance during Side Impact Collisions".

(Continued)

*Primary Examiner* — Rodney B White
(74) *Attorney, Agent, or Firm* — Nields, Lemack & Frame, LLC

(57) ABSTRACT

A novel infant child restraint system that includes a base having a height adjustment to allow the base to assume one of a plurality of positions and inclinations when mounted to the vehicle seat. Additionally, in certain embodiments the base is formed to have a recessed knee-receiving area, into which the user can place their knee when tightening the vehicle's restraint system around the base. The base and car seat are removably attached in interlocking relation using a novel connection mechanism that is not susceptible to premature or improper release due to forces, regardless of the direction of such forces. This mechanism is independent of the car seat handle. Furthermore, this connection mechanism includes a simple manual disconnect or release system, to allow quick removal of the seat from the base.

21 Claims, 49 Drawing Sheets

U.S. PATENT DOCUMENTS

| | | |
|---|---|---|
| 2005/0110318 A1* | 5/2005 | Meeker et al. ............ 297/256.16 |
| 2005/0264062 A1 | 12/2005 | Longenecker et al. |
| 2006/0273640 A1* | 12/2006 | Kassai et al. ............. 297/256.16 |
| 2008/0169692 A1 | 7/2008 | Clement et al. |
| 2008/0224516 A1* | 9/2008 | Vegt ......................... 297/256.16 |
| 2008/0258518 A1 | 10/2008 | Jane Santamaria |
| 2009/0066125 A1 | 3/2009 | Nett et al. |
| 2010/0019557 A1* | 1/2010 | Longenecker et al. .................... 297/256.16 X |
| 2011/0304178 A1 | 12/2011 | Rajasingham |
| 2012/0013157 A1 | 1/2012 | Keegan et al. |
| 2012/0013160 A1* | 1/2012 | Williams et al. ......... 297/256.16 |

OTHER PUBLICATIONS

Office Action mailed Sep. 21, 2012 in co-pending U.S. Appl. No. 13/004,092.

* cited by examiner

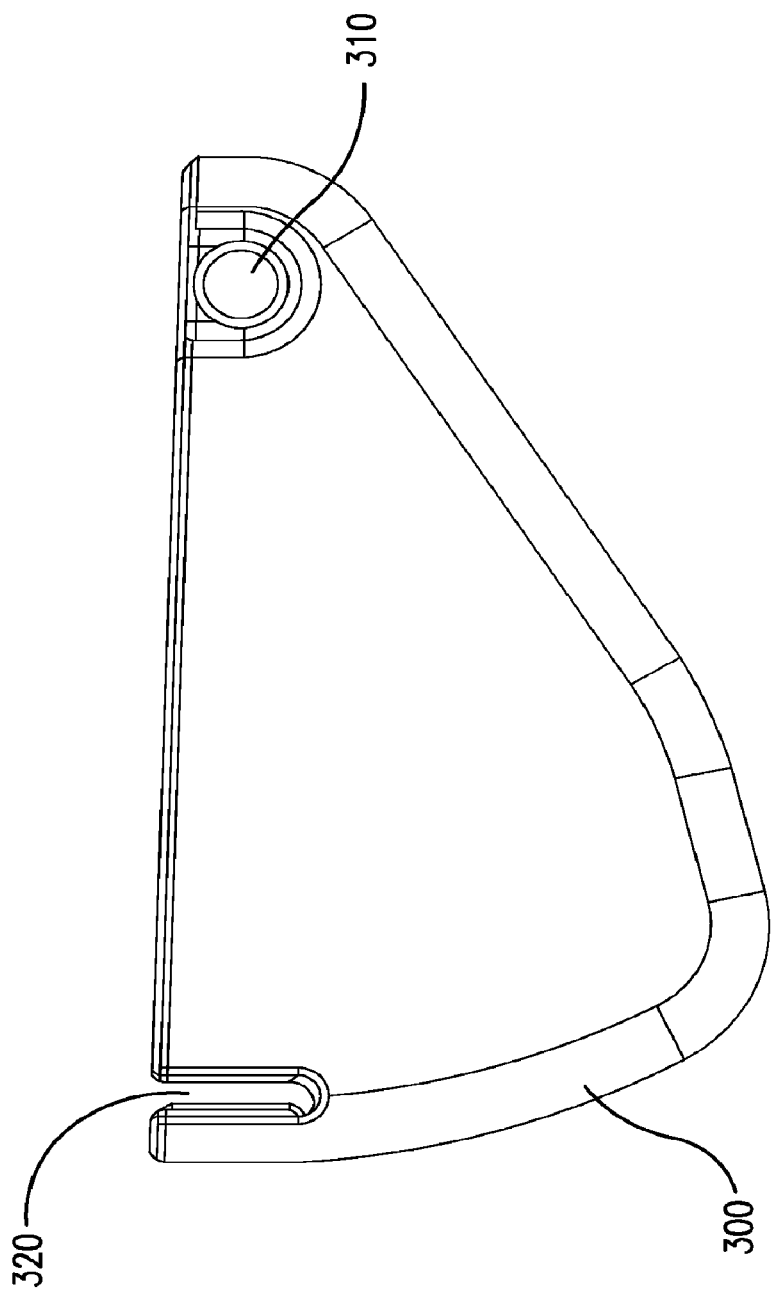

INFANT CHILD RESTRAINT SYSTEM

This application claims priority of U.S. Provisional Patent Application Ser. No. 61/288,579, filed Dec. 21, 2009, the disclosure of which is incorporated herein by reference in its entirety.

BACKGROUND OF THE INVENTION

Infant child restraint systems are well known in the art. Typically, the infant child restraint system is made up of two parts; an infant car seat and a base into which the infant car seat is mounted. The base is positioned on the seat of a vehicle, such as a car, truck, train or airplane, and secured using the restraint system of the vehicle, or a latch system. For example, a base is typically secured in place on an automobile seat through the use of the vehicle's seat belt or a latch system.

The infant car seat is then attached to the base, typically using one or more connection points. This allows the base to be left secured to the vehicle seat, while only the baby seat is removed. To provide maximum protection to the infant, the infant seat is typically oriented such that when the infant occupies the seat, the infant's feet are nearest the seat back.

There are a number of issues associated with each of these two components. For example, as stated above, the base is typically secured to the vehicle seat via the restraint system. Usually the restraint system consists of a lap belt, which in its operative mode is a horizontally disposed belt that passes across the passenger at the waist. The restraint system also includes a shoulder belt, which in its operative mode is slanted and positioned from the waist of the passenger on one side to the opposite shoulder. Alternatively, a latch system can be employed.

In view of its low vertical profile, the base generally must be secured using only the lap and shoulder belt. Given the single axis of restraint, it is important that the weight of the base (with the baby seat) is properly distributed. If the belt crosses the base at an unstable position, it is possible that the base may be able to rotate about this axis of restraint, especially in the case of a sudden change in motion, such as sudden braking or a crash impact.

A second issue associated with the base is the need to insure that the base is tightly secured by the vehicle's restraint system. If the belt is not taut, it is possible that the base (and attached baby seat) can shift forward during a sudden stop or crash impact.

Another issue is the variation in slope and position of the vehicle seat onto which the base is placed. For example, some vehicle seats are horizontal, or nearly horizontal. Others, however, are much more sloped. Typically, the inner portion of the seat, where it meets the seat back, will be at a lower height then the outer portion of the seat, where the user's legs hang from. Therefore, the base, unless it has an adjustment, is positioned at different inclinations, based on the vehicle's seat. These differences in inclination cause the infant car seat to also be at different inclinations; some of which may not offer sufficient protection for the infant. Height adjustments within the base can be used to minimize this issue.

In addition to the above mentioned safety concerns associated with the base, there are also a number associated with the connection of the base to the infant car seat. The connection of the base to the infant car seat has conflicting goals. On the one hand, it is preferable for the seat to be easily disconnected from the base, so that a parent can easily separate the infant car seat from the base and use the disconnected seat as a baby-carrying apparatus. On the other hand, it is imperative that the connection be robust enough that it does not inadvertently disconnect in response to a sudden motion or impact.

Therefore, it is important that the connection mechanism between the base and the infant car seat be easily actuated yet robust, even in the presence of sudden, unexpected movements. Some connection mechanisms are optimized to withstand forces in one particular direction. In other words, they are tested to insure no inadvertent disconnections when the seat is forced forward relative to the base. While this is obviously important, this connection must equally withstand forces that tend to push the infant car seat backward, to the left and to the right.

While the strength of the connection cannot be compromised, there is a need for a manual disconnect mechanism that is preferably simple and requires little force to operate. This manual disconnect mechanism is preferably operable using a single hand, such that the other hand can be used to hold or support the infant car seat. Additionally, the mechanism should preferably be located in a convenient location, so that the user can readily access the mechanism with minimum inconvenience.

In addition to the strength and convenience of the connection mechanism, another important consideration is the location of the mechanism with respect to both the base and the car seat. In some embodiments of the prior art, the connection mechanism includes one point of attachment. In this scenario, the location of that attachment point is critical. If the attachment point is located near one end of the car seat, such as near the feet, it may be possible for the car seat to rotate about this attachment point. For example, a sudden stop may cause the car seat to move relative to the base. If the attachment point is located near the end of the car seat (either the head end or the foot end), the seat can rotate about this point, causing unnecessary motion of the seat and excessive stress on the attachment point and connection mechanism.

Some other considerations include the overall weight and strength of the infant car seat, and its ability to be attached to a stroller, or other apparatus.

Currently, some of these issues are addressed in a variety of ways, with varying degrees of success. In some cases, the solutions to these issues are expensive, thereby raising the price of the infant child restraint system. It would be beneficial if these issues could be addressed in a safe, convenient and cost effective manner.

SUMMARY

The problems of the prior art are addressed by a novel infant child restraint system. This system includes a base having a height adjustment to allow the base to assume one of a plurality of positions and inclinations when mounted to the vehicle seat. Additionally, in certain embodiments the base is formed to have a recessed knee-receiving area, into which the user can place their knee when tightening the vehicle's restraint system around the base. The base is configured not only to be mounted to a vehicle seat, but also to removably receive a child carrier, such as a car seat.

The base and car seat are removably attached in interlocking relation using a novel connection mechanism that is not susceptible to premature or improper release due to forces, regardless of the direction of such forces. This mechanism is independent of the car seat handle. Furthermore, this connection mechanism includes a simple manual disconnect or release system, to allow quick removal of the seat from the base. The connection mechanism is positioned at attachment points on the base in such a position such that the seat will not rotate relative to the base in the event of sudden deceleration or impact of the vehicle.

BRIEF DESCRIPTION OF THE DRAWINGS

FIG. 17 shows the height adjuster of FIG. 16a-b;

DETAILED DESCRIPTION OF THE INVENTION

Figure 1:
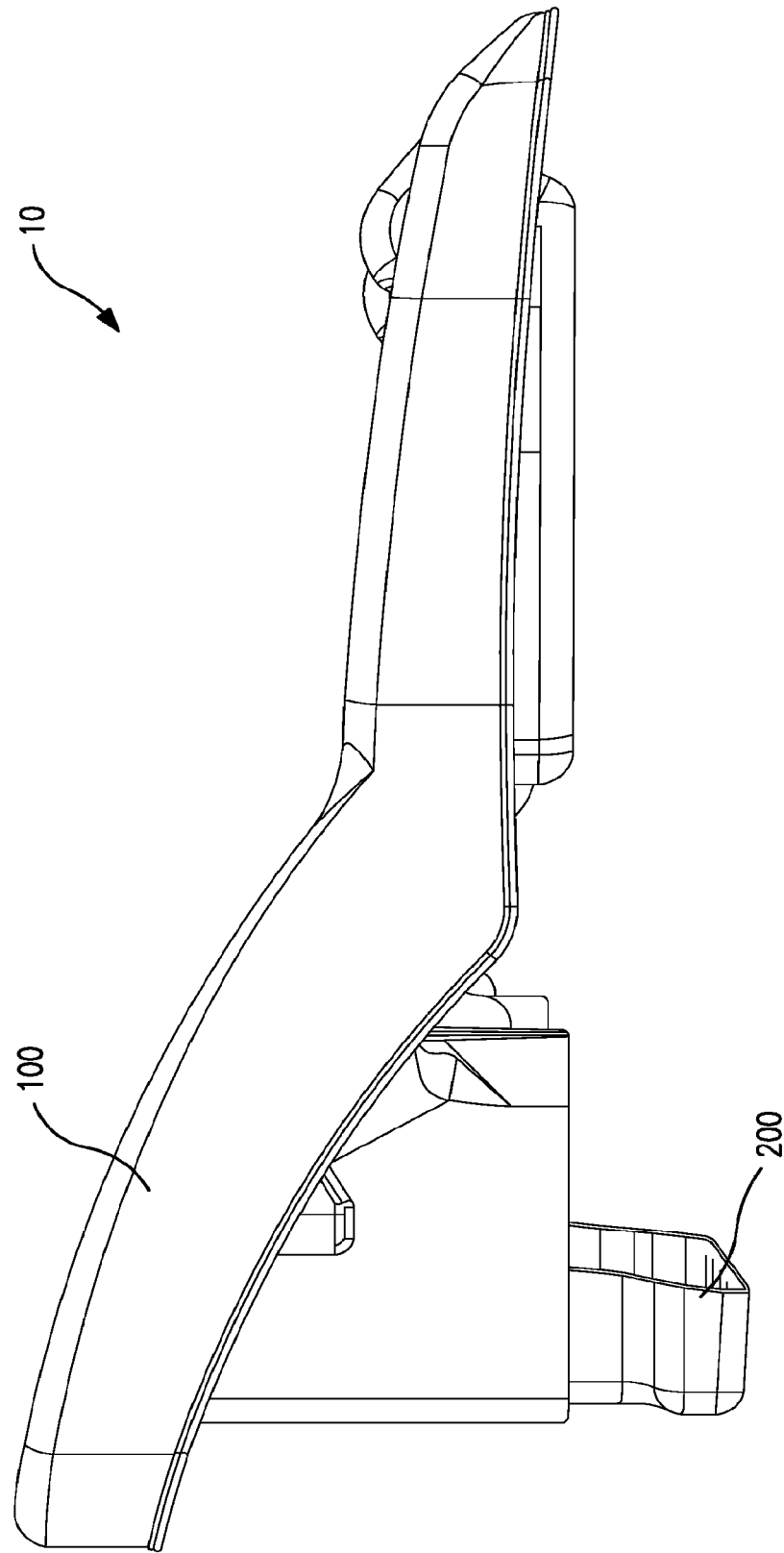
FIG. 1 is a side view of the base according to one embodiment of the present invention.

FIG. 1 shows a side view of the base 10 of the infant child restraint system, in accordance with one embodiment. The base 10 is comprised of two parts, a base plate 100 and a height adjuster 200. In one embodiment, the base plate is a single molded plastic part. It may be made from polypropylene or other plastic. Similarly, the height adjuster 200 is also a single molded plastic part, made from similar materials.

Figure 2:
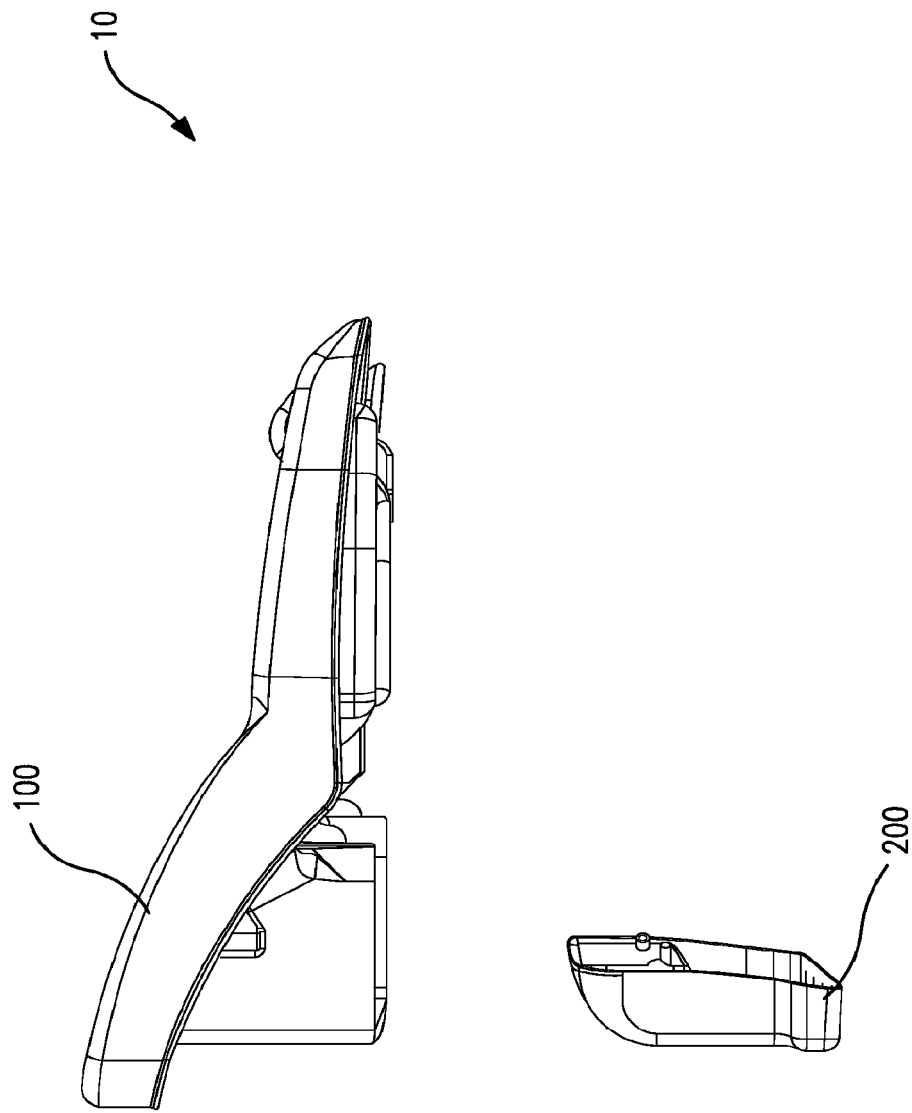
FIG. 2 is an exploded view of the base of FIG. 1, showing the base plate and the height adjuster.

FIG. 2 shows an exploded view of the base 10, showing the relative sizes and positioning of the base plate 100 and the height adjuster 200.

Figure 3:
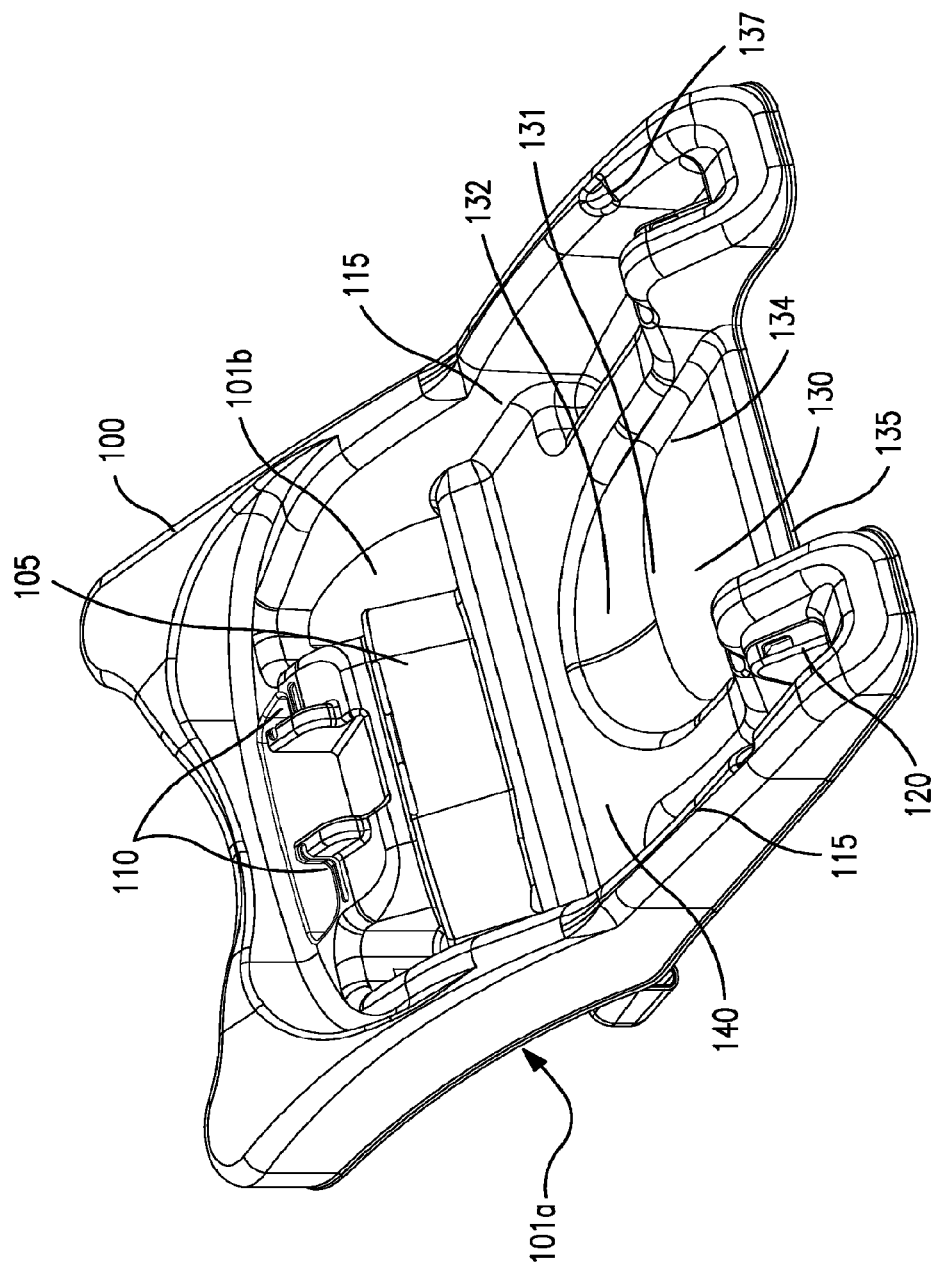
FIG. 3 is an isometric view of the base plate of FIG. 2.

FIG. 3 shows a perspective view of the base plate 100. Base plate 100 has two openings 101a, 101b through which the vehicle's restraint system can pass. In addition, a belt guide path 105 is positioned between the two openings 101a, 101b and defines the regions where the vehicle's seat belt or latch system presses against the base plate 100. The vehicle's belt passes through one of the openings 101, over the belt guide path 105, and through the second opening 101. The fastener for the vehicle belt that locks the belt in place may be located outside of the base plate 100, or between openings 101a, 101b. The base plate 100 also includes an attachment point 110 to which the infant car seat is connected. The placement of the attachment point 110 above the guide path 105 provides a secure location, sandwiched between the belt and the seat back.

The base plate 100 also may include one or more grooves 115, into which contoured edges of the infant car seat (not shown) may rest. Although the seat is not secured to these grooves, the use of these grooves 115 and contours increases the stability of the infant car seat in the base 100. Optionally, one or more catches 120 may be inserted into the base plate 100. These catches 120 are located so as to correspond to claws on the infant car seat. In this embodiment, the infant car seat is connected to the base plate 100 at attachment point 110, as well as at catches 120. The infant car seat is then pressed in a downward direction so that the clips 120 snap into place, as is described in more detail later.

One of the issues cited above is the need to insure that the base 100 is secured tightly by the vehicle's restraint system. Typically, the base 100 is placed on the vehicle's seat and the vehicle's restraint belt is tightened around the base in some manner. As it is critical to maintain tautness, the operator often attempts to push the base downwardly and rearwardly, so as to press it into the junction formed by vehicle's seat and seat back. Such a process is typically ineffective, and is awkward and inconvenient for the user, resulting in extra length in the belt, thereby allowing the base 10 to move relative to the vehicle seat.

Accordingly, in accordance with certain embodiments, base plate 100 includes a molded recess 130 in the general area that is configured to rest on the vehicle's seat. The recess 130 has an arcuate end 131, furthest from the front edge 135 of the base 100. The arcuate end 131 may be semicircular, arced or curvilinear. In some embodiments, the radius of the arc of the arcuate end is designed to be slightly larger than that of a typical bent knee shape. The sides 134 of the recess 130 may be straight and may be parallel to one another, or may extend slightly outwardly going from the arcuate end 131 to the front edge 135. In another embodiment, the sides 134 may extend inwardly going from the arcuate end 131 to the front edge 135.

The arcuate end 131 transitions to the upper level 140 on the base plate 100 via a sloped surface 132. This sloped surface is preferably concave up. Similarly, sides 134 transition to a higher level on the base plate 100 via a sloped surface 132. The sloped surface 132 preferably meets the upper level 140 in an arcuate shape.

In operation, the recess 130 and sloped surfaces 134 are configured to accommodate the knee of the operator. The user would place their knee in the recess 130. They would then use the sloped surface 132 as leverage to drive their knee forward, toward the seat back. Due to the shape of the recess and the sloped surface, the user's knee is not subjected to any sharp edges, and therefore, the user is able to apply greater downward and forward force. This allows the restraint system to be secured at its tightness point. It is important to note that the recess and sloped walls provide surfaces in two directions for the user. Thus, the recess 130 provides a surface which the user can push downward. Sloped surfaces 132 provide a surface which the user can push forward. This configuration, built to accommodate the general shape of a bent knee, allows maximum force to be exerted.

Figure 4:
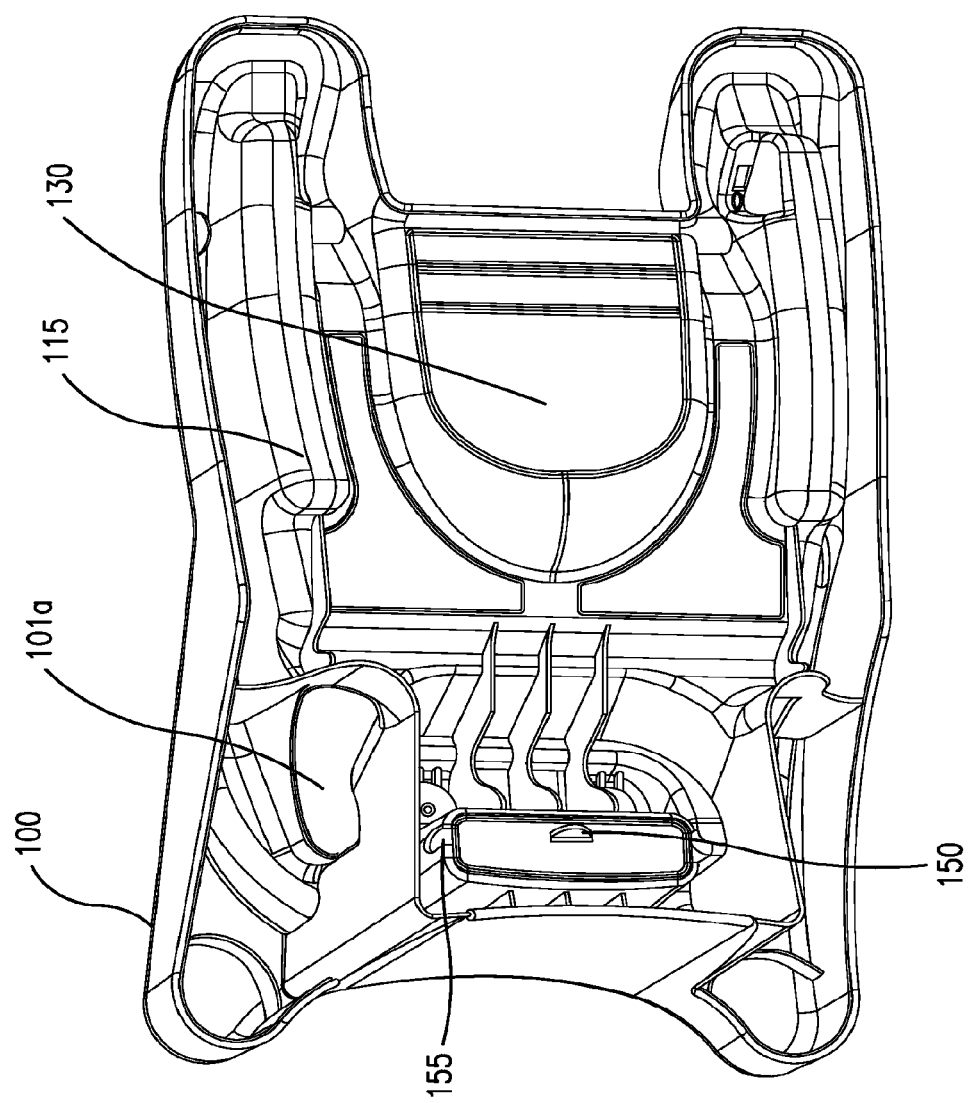
FIG. 4 is a bottom view of the base plate of FIG. 3.

FIG. 4 shows a bottom view of the base plate 100. In this view, one of the openings 101a is visible. The shape of the recess 130 is also visible from the bottom side of the base plate, although this is not a requirement of the design. Near the rear of the base plate, there are two slots 155 (only one shown). These slots are used to accommodate the height adjuster 200, as will be described in more detail later. A raised tab 150 is also used in conjunction with the height adjuster 200.

Figure 5:
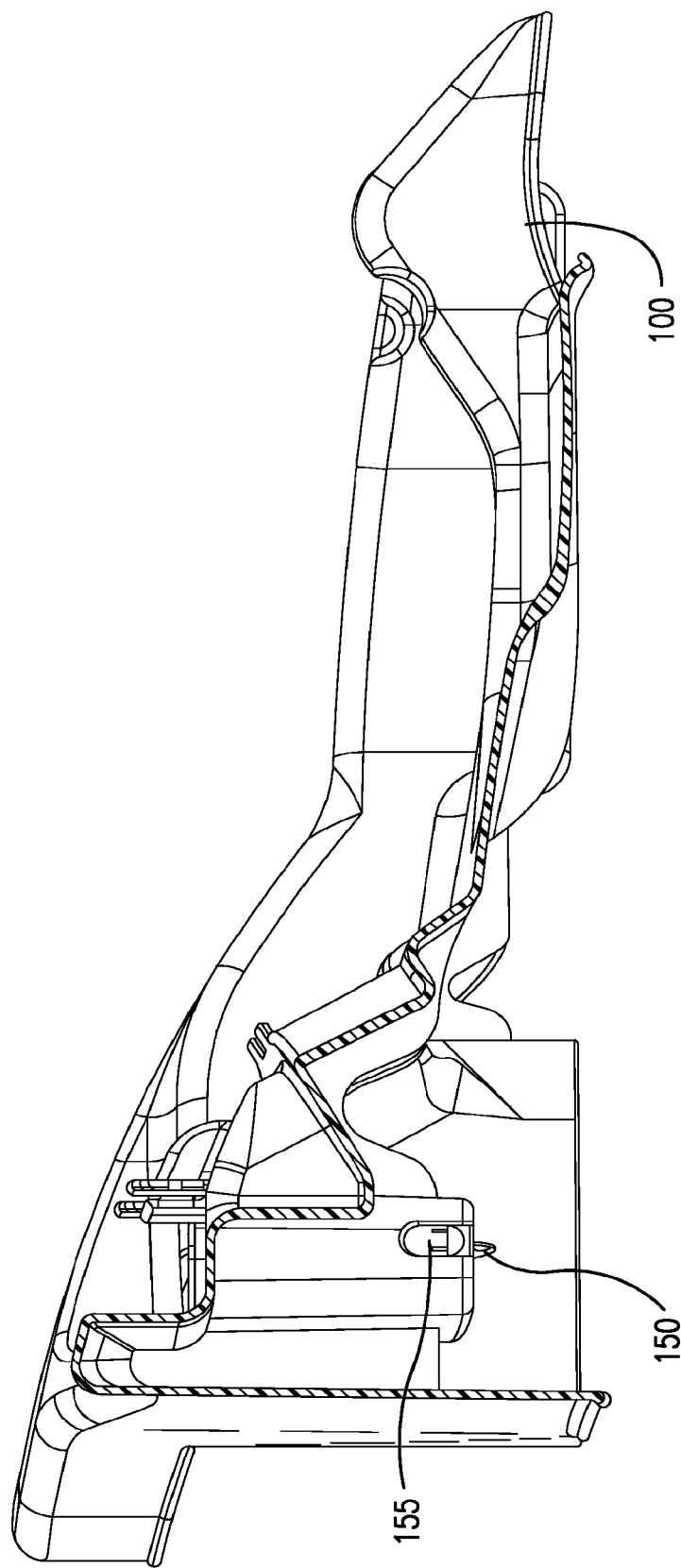
FIG. 5 is a cross section of the base plate of FIG. 3.

FIG. 5 is a cross section of the base plate 100. This cross section shows the slot 155 that accepts a post on the height adjuster 200. The tab 150 is also visible.

Figure 6:
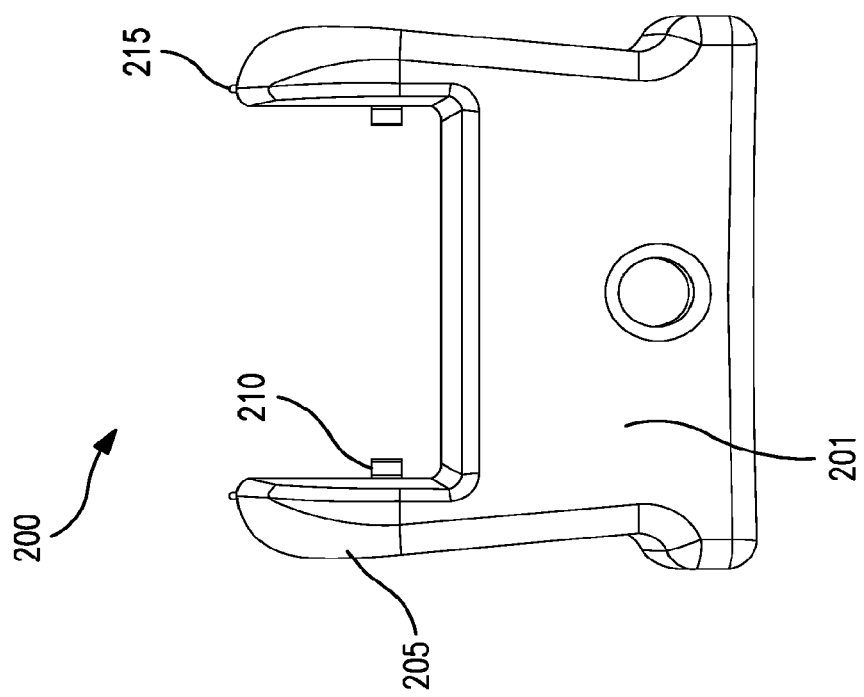
FIG. 6 is a front view of the height adjuster of FIG. 2.

FIG. 6 shows a front view of a first embodiment of the height adjuster 200. The front surface of the height adjuster is preferably smooth, since in one position, this surface is in contact with the vehicle seat. The height adjuster 200 has a roughly rectangular body 201, with two arms 205 extending upward. Each arm 205 has a radially inwardly facing post 210, which mates with slots 155 on the base plate 100. In another embodiment, the arms may be located closer to the middle of the body 201, with the posts 210 facing radially outwardly. Small protrusions 215 may be located on the top of each arm 205, and extend axially therefrom. Although not shown, the bottom surface of the height adjuster 200 is also preferably smooth, as it contacts the vehicle's seat in one position.

Figure 7:
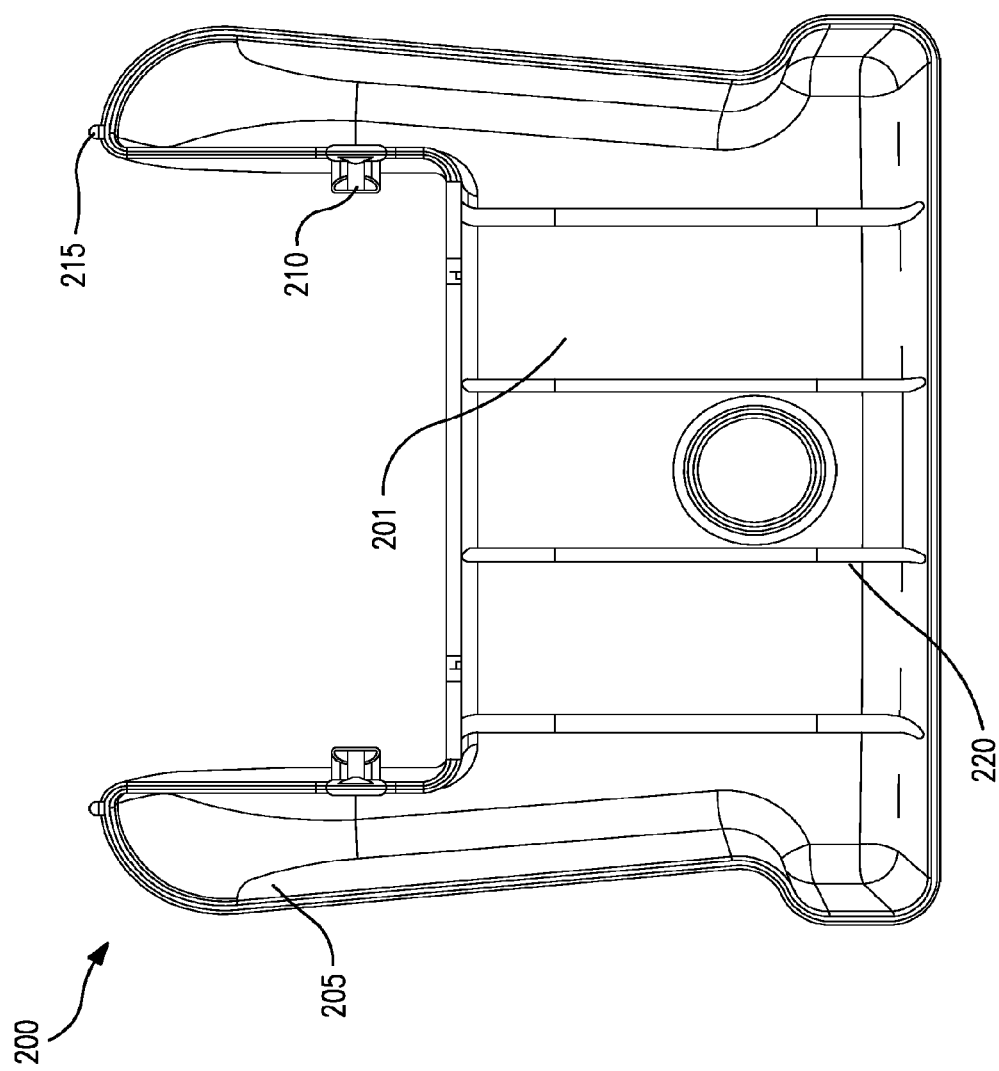
FIG. 7 is a back view of the height adjuster of FIG. 2.

FIG. 7 shows a rear view of the height adjuster 200 of FIG. 6. The rear surface need not be smooth, as it never contacts the vehicle's seat. To provide additional strength, the height adjuster 200 may have ribs 220 across the rectangular body 201. Although spaced axial ribs are shown, the number, spacing, thickness and positioning of the ribs is not particularly limited. If desired, ribs can also be placed within the arms 205. In addition to posts 210, two small protrusions 215 are visible on the top of the arms 205.

Figure 8:
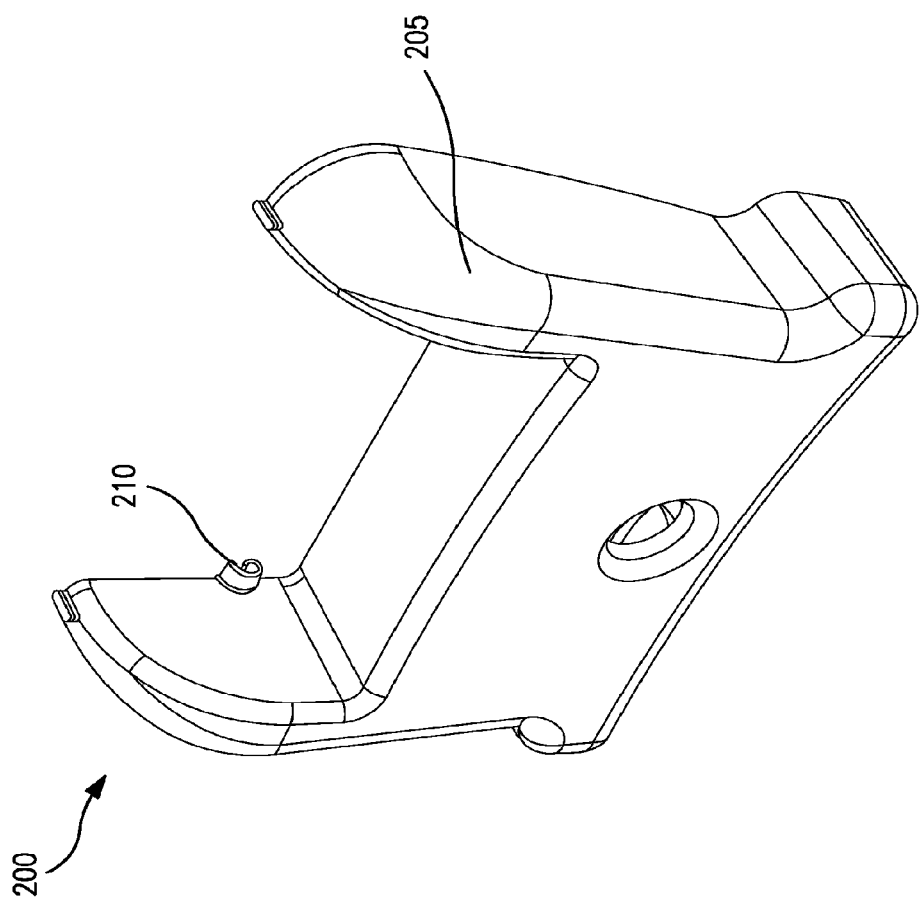
FIG. 8 is an isometric view of the height adjuster of FIG. 2.
Figure 9:
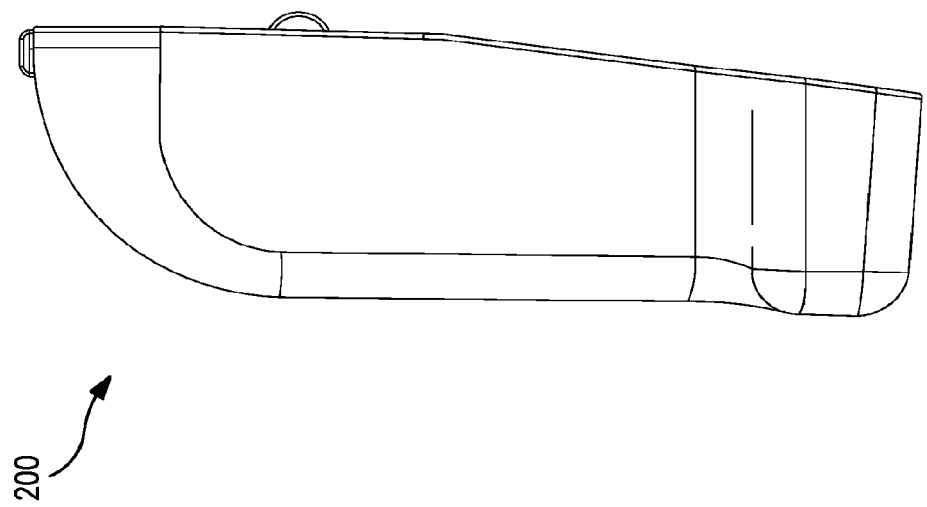
FIG. 9 is a side view of the height adjuster of FIG. 2.

FIGS. 8 and 9 show two additional views of the height adjuster 200. The front surface of arms 205 are preferably curved inwardly in the direction from the rectangular body 201 to the top of the adjuster 200. As will be described in more detail below, the adjuster 200 rotates about the posts 210. The curved shape of the front of the arms allows this rotation to occur.

Figure 10:
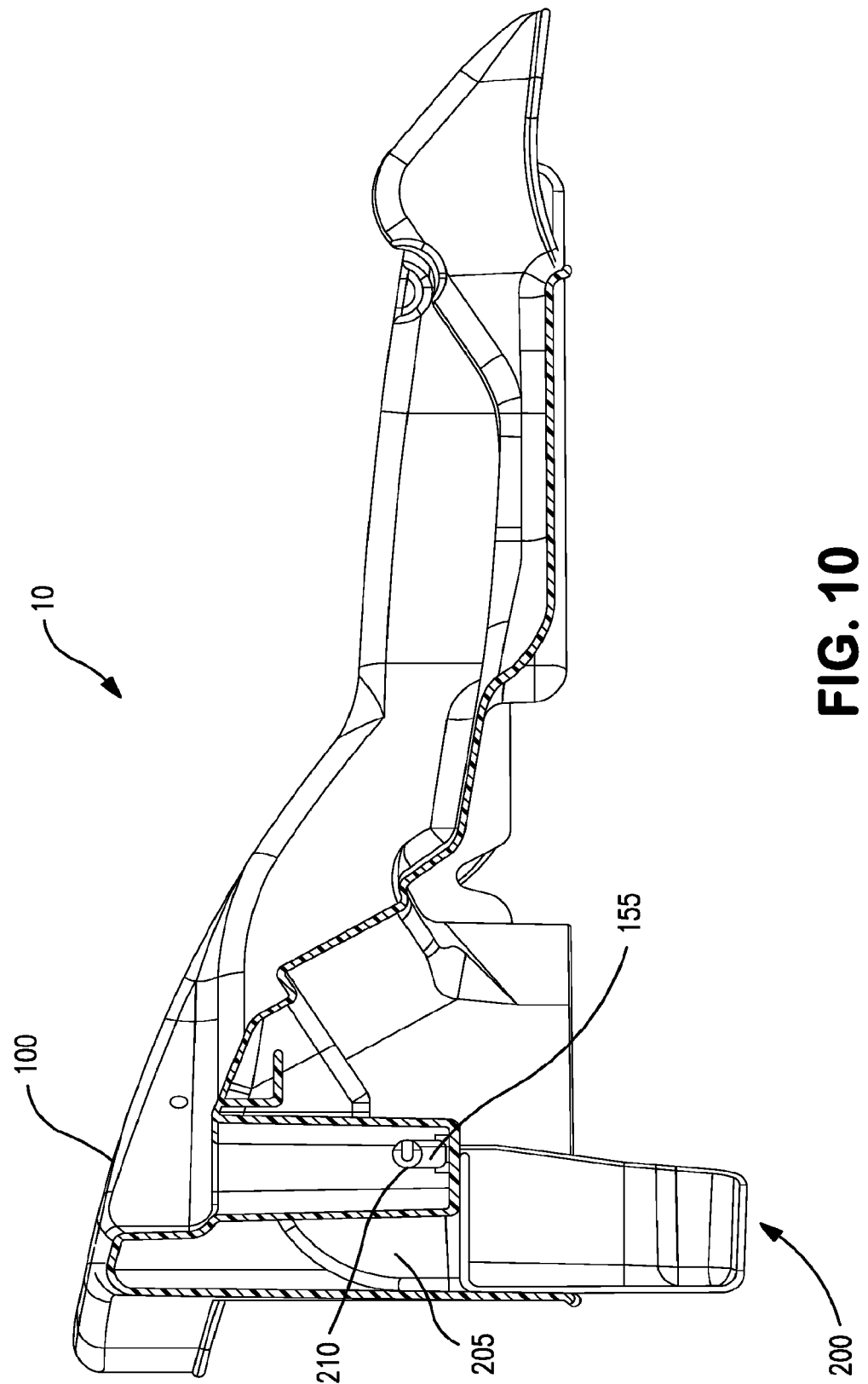
FIG. 10 is a cross section of the base of FIG. 1 shown at the hinge point of the height adjuster.

FIG. 10 shows a cross section of base 10, with the adjuster 200 in a first, fully extended position. Posts 210 on the adjuster 200 are shown inserted into slots 155 of the base plate 100. As can be seen in FIG. 10, slots 155 are preferably oblong, providing a track in which the posts 210 can travel axially in response to a force applied to the adjuster 200. It is also seen that the curvature of arms 205 allows them (and the adjuster 200) to rotate about the axis defined by the posts, without being impeded by the wall of the base plate 100.

Figure 11:
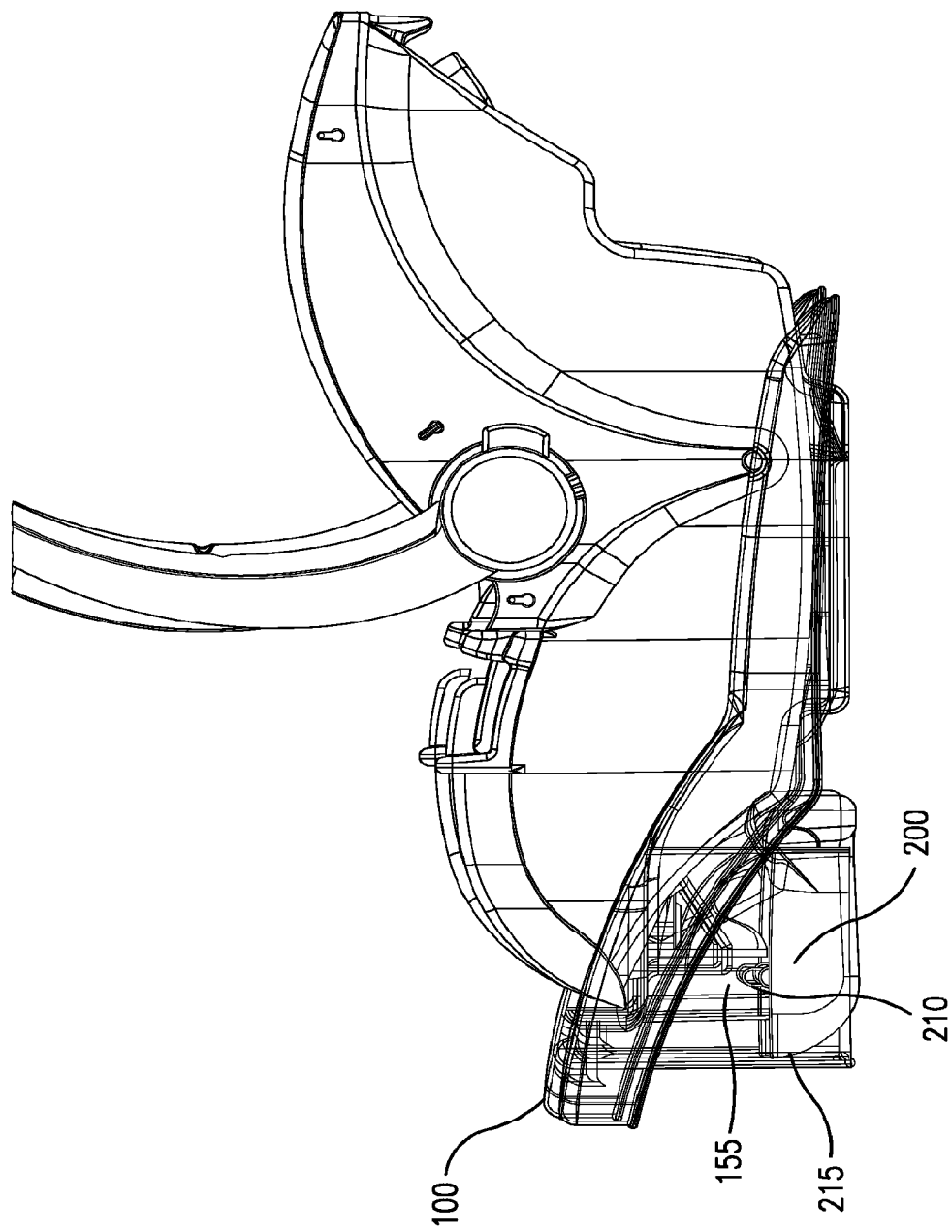
FIG. 11 shows an infant child restraint system with the height adjuster in a first position.

FIG. 11 shows the infant child restraint system with the height adjuster 200 in a second, fully retracted position. As described above, the front surface of the adjuster 200 is preferably smooth as this surface is in contact with the vehicle's seat. In this second position, the posts 210 are positioned at the lower end of slots 155. The protrusions 215 may press against the inside wall, forcing it to bow slightly outward. The pressure exerted by the bowed wall in this orientation helps to retain the adjuster 200 in this position.

Figure 12:
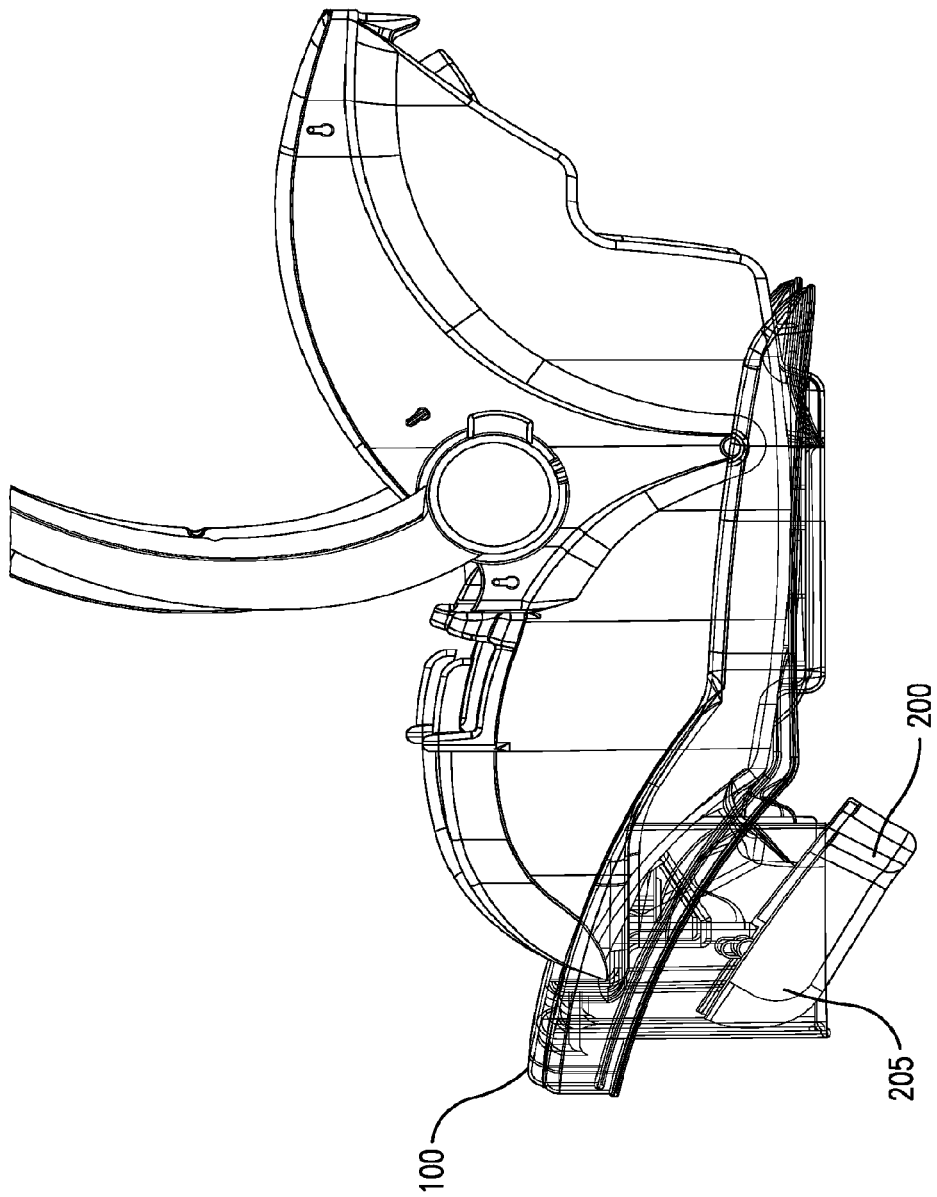
FIG. 12 shows an infant child restraint system with the height adjuster as it transitions from a first position to a second position.

FIG. 12 shows the infant child restraint system as the height adjuster in an intermediate position as it moves from the second, fully retracted position to the first, fully extended position (or vice versa). In this stage of movement, the adjuster 200 is being rotated about the axis defined by the posts 210. The curvature of the arms allows the adjuster to turn. As this happens, the bottom surface of the adjuster begins to emerge from the base plate 100.

Figure 13:
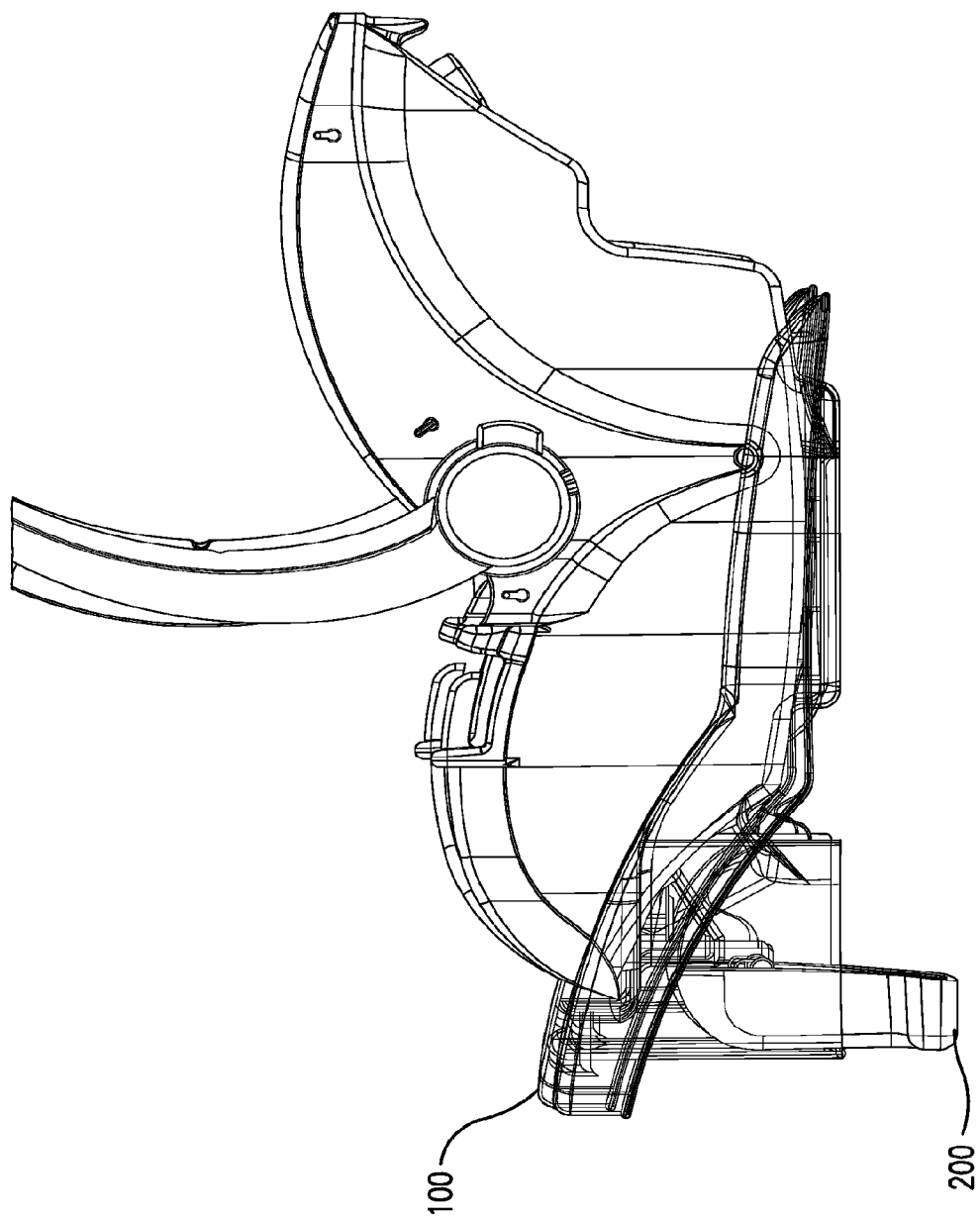
FIG. 13 shows an infant child restraint system with the height adjuster as it transitions from a first position to a second position.

FIG. 13 shows the infant child restraint system as the height adjuster from the second position to the first position. In this stage of movement, the adjuster 200 has been rotated about the axis defined by the posts 210 until its front surface is against the inside wall of the base plate 100. The bottom surface of the adjuster is now in contact with the vehicle's seat.

Figure 14:
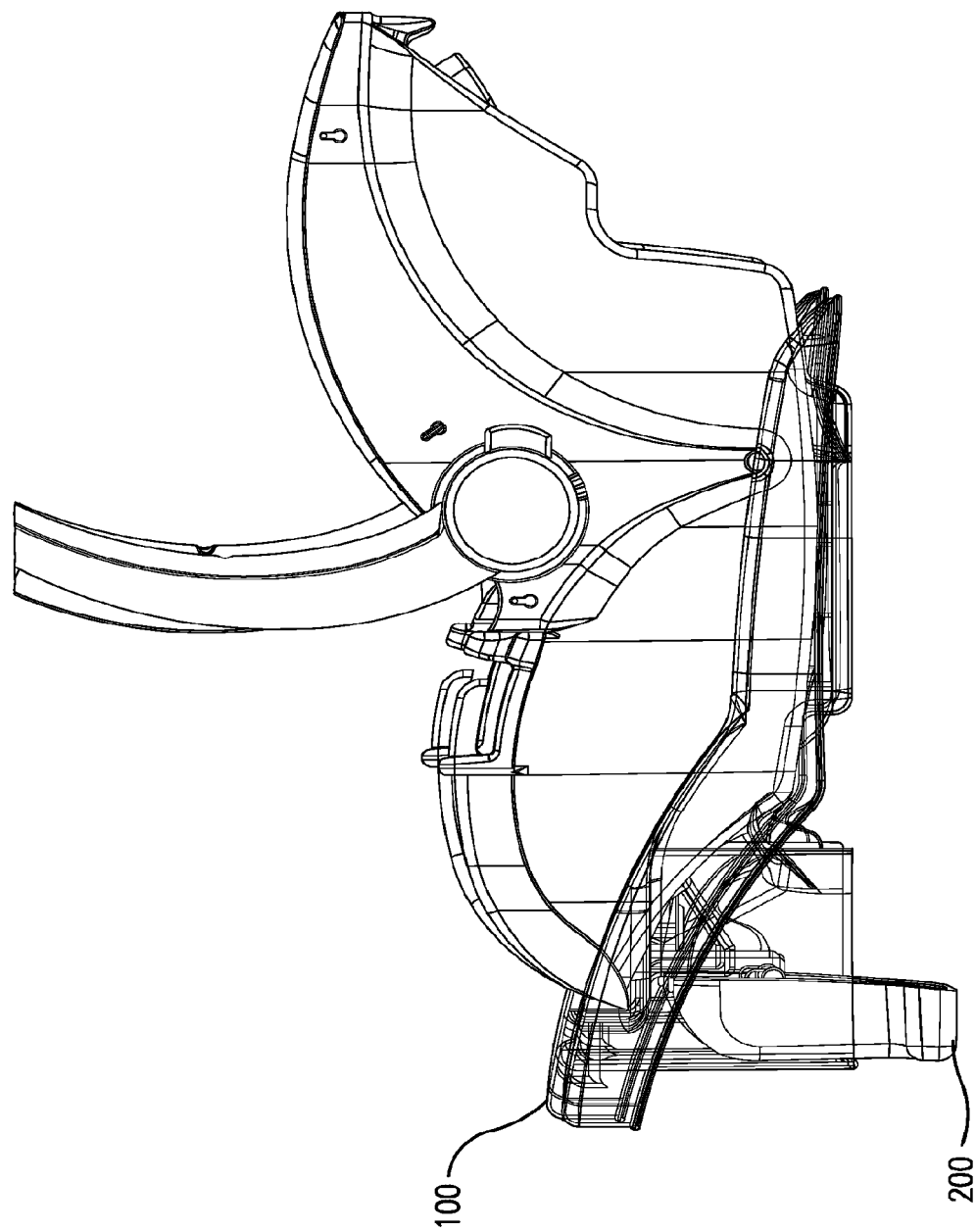
FIG. 14 shows an infant child restraint system with the height adjuster in a second position.
Figure 15:
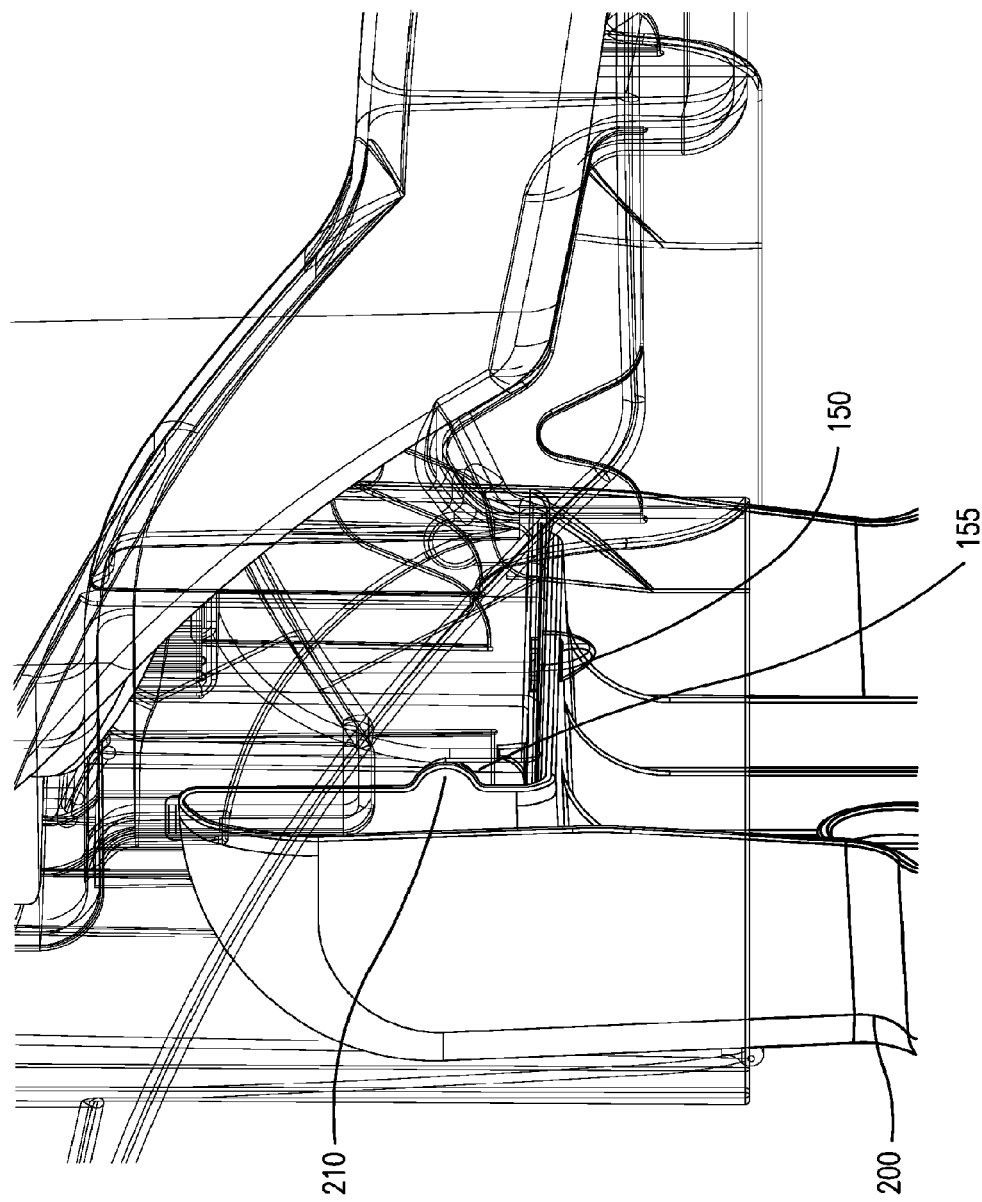
FIG. 15 shows an expanded view of the connection between the height adjuster and the base plate.

FIGS. 14 and 15 show the infant child restraint system in a second position. In this stage, the adjuster is moved upward, such that the posts 210 are against the upper end of the slots 155. When in this position, tab 150 (also see FIG. 4) is now beyond the rear surface of the adjuster, thereby holding the adjuster in place between the inner wall and the tab 150. In another embodiment, the adjuster 200 has a corresponding aperture on the top surface of the rectangular body 201, such that by moving the adjuster 200 upward into the slot 155, the tab 150 slides into the aperture in the adjuster 200, thereby holding it in this second position. In both of these embodiments, the tab 150 serves to create a second stable location, whereby the height adjuster cannot move without manual intervention.

This embodiment shows an example where the height adjustment is achieved through roughly a 90° rotation of the adjuster 200. In one embodiment, the adjuster is positioned with its front surface roughly parallel to the vehicle's seat in one position. In another position, the adjuster is rotated so that the front surface is roughly perpendicular to the vehicle's seat. Posts in the adjuster and slots in the base plate are but one way to achieve this type and degree of motion.

Figure 16A:
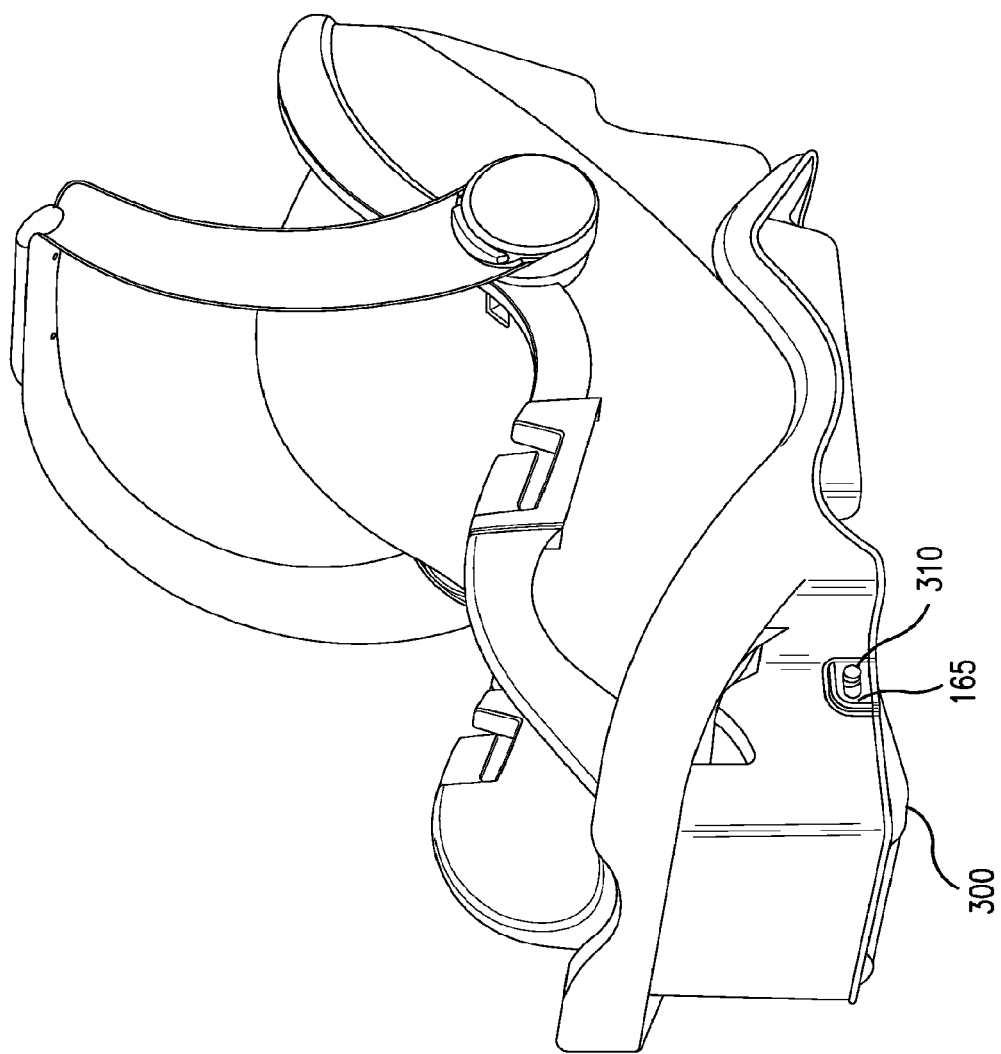
FIG. 16a shows a second embodiment of an infant child restraint system with a height adjuster in a first position.
Figure 18:
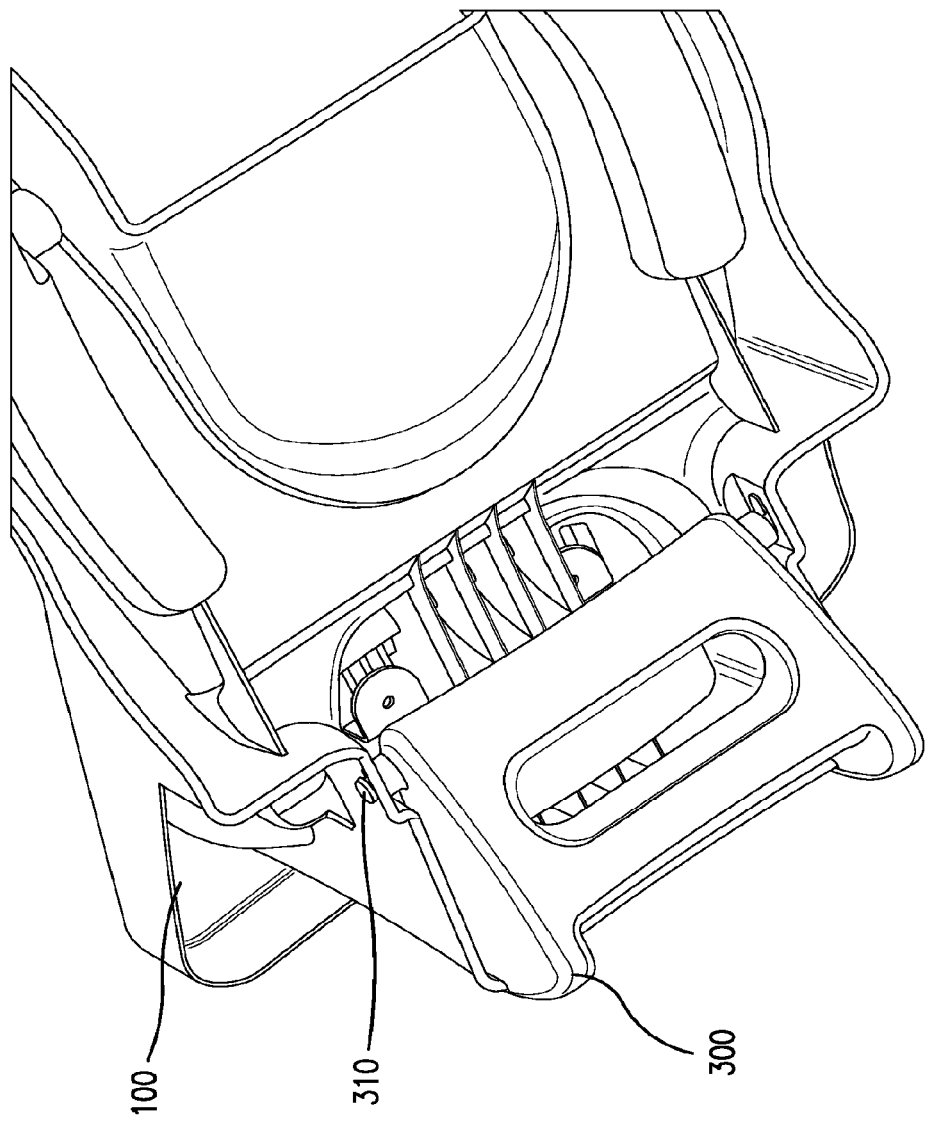
FIG. 18 shows bottom view of the height adjuster of FIG. 16.

FIGS. 16-18 show a second embodiment of the height adjuster 300. In this embodiment, the adjuster 300 also has 2 positions. FIG. 16*a* shows the infant child restraint system in the first position. As can be seen in this figure, the height adjuster 300 has posts 310 located along its outside edges. These posts are inserted into slots 165 in the base plate 100. As before, the slots 165 are preferably oblong, so that the posts 310 can travel in one direction within the slot. As shown in FIG. 16*a*, the posts 310 are slid forward in slots 165.

Preferably height adjuster 300 extends slightly from the base plate 100 in this first position (as was also shown in FIG. 11). Since the front surface of the height adjuster is smooth, it will not damage the vehicle's seat. By extending slightly beyond the base plate 100, the edges of the base plate are not in contact with the seat, allowing them to be less finished.

Figure 16B:
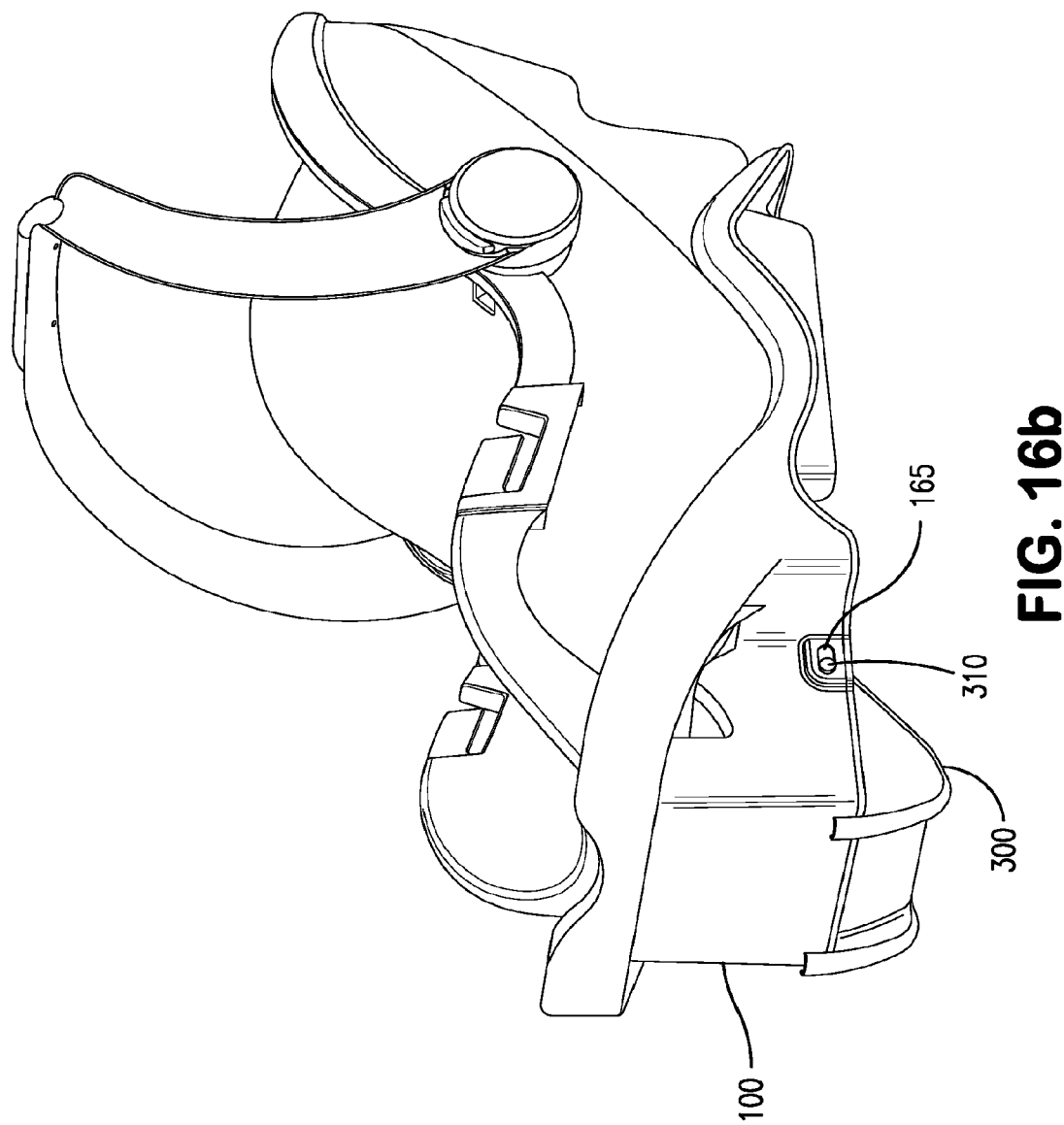
FIG. 16b shows a second embodiment of an infant child restraint system with a height adjuster in a second position.

FIG. 16*b* shows the infant child restraint system in a second position. In this position, the height adjuster 300 extends beyond the back of the base plate 100, thereby raising its height. As shown in FIG. 17, in one embodiment, there is a slotted opening 320 in the height adjuster 300, such that the bottom edge of the base plate 100 rests in the slotted opening 320 in the second position. To allow the adjuster 300 to extend beyond the rear wall, the posts 310 are moved back against the slots 165.

To move between the first position and the second position, the adjuster 300 is first rotated about the axis defined by the posts 310. This allows the adjuster 300 to extend beyond the bottom of the base plate 100. When the adjuster 300 has rotated sufficiently, the adjuster 300 is then pulled back toward the rear of the base plate 100, forcing the posts 310 to slide in the slots 165 from their forward position to the back position. The adjuster 300 is then rotated in the opposite direction until the bottom edge of the base plate 100 enters the slotted openings 320 (FIG. 17) in the adjuster 300. To return to the first position, these steps are simply performed in reverse.

FIG. 17 shows a side view of the adjuster 300 in isolation. Slotted openings 320 exist on the upper portion of the adjuster, and are configured to allow the bottom of base plate 100 to slide therein. Also on the upper portion of the adjuster 300 are the radially extending posts 310, which slidingly cooperate with the slots 165 in base 100 (see FIG. 16*b*) to allow the pivotable attachment of the adjuster 300 to the base plate 100. Although not required by the invention, the lower portion of the adjuster is preferably smooth, as it rests against the vehicle seat.

FIG. 18 shows a bottom view of the adjuster 300 in the base plate 100. The adjuster 300 is in the first, fully extended position in this figure.

This embodiment shows an example where the height adjuster rotates less than 90° and uses lateral translation of the posts within the slot to move between the two positions. The embodiment of FIGS. 16-18 is not to be considering limiting. For example, the height adjuster 300 may be oriented roughly perpendicular to the vehicle's seat. In one position, the height adjuster does not extend beyond the bottom of the base plate 100. To move to the second position, the adjuster is moved vertically along an elongated slot. At the bottom of the slot, the adjuster is rotated slightly, so that a slot in the adjuster is engaged by the rear wall of the base plate 100.

Figure 19:
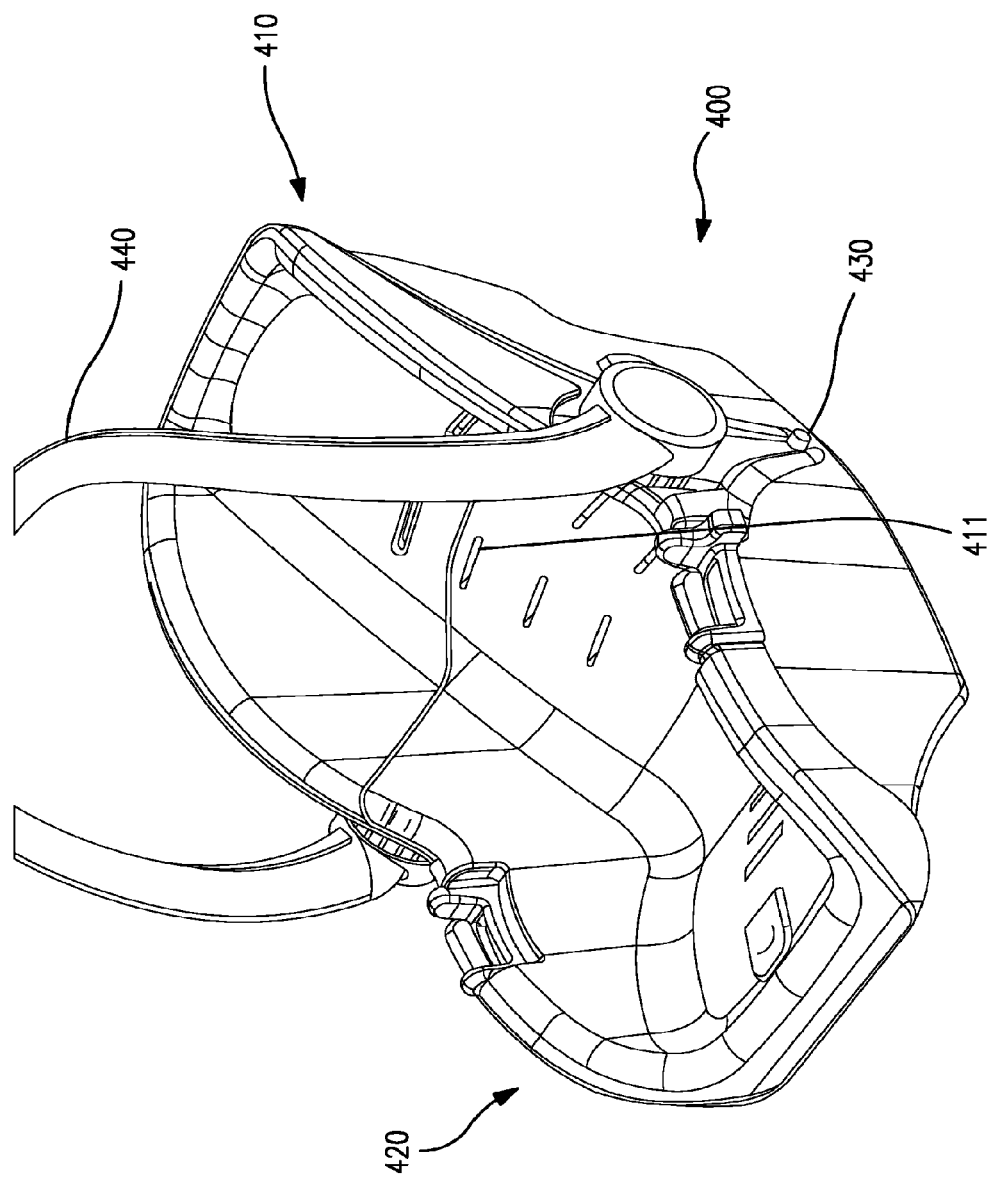
FIG. 19 shows a perspective view of the infant car seat.

FIG. 19 shows the car seat 400. The car seat 400 has a head end 410, where the child's head is placed, and a foot end 420, with a back support therebetween. When inserted into the base 100, the foot end 420 is closest to the seat back. This offers maximum protection for an infant, as a sudden stop of the vehicle does not force the infant forward into the restraints. Rather, a sudden stop pushes the baby toward the padding in the infant car seat 400. The various slits 411 shown in FIG. 19 are used to adjust the restraints that are used to hold the infant in the car seat (not shown).

In certain embodiments, the car seat 400 also includes radially extending connection points 430, which may serve two purposes. In some embodiments, these connection points 430 snap into notches or recesses 137 in the base 100 (see FIG. 3), which serve as an additional set of attachment points between the car seat 400 and the base 100. In some embodiments, these connection points may be used to attach the infant car seat into a corresponding stroller or other similar apparatus. The infant seat also comprises a handle 440.

Figure 20:
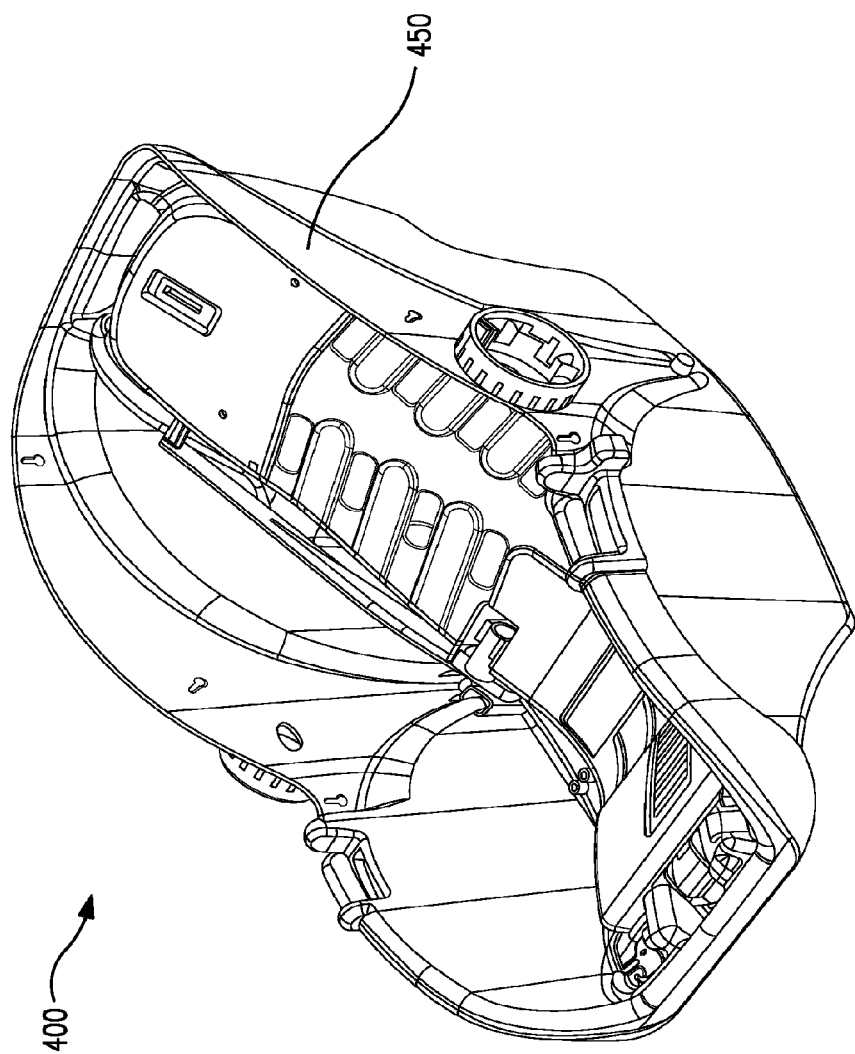
FIG. 20 shows a view of the infant car seat of FIG. 19 with the padding removed to reveal internal elements.

FIG. 20 shows the car seat 400 of FIG. 19 with the padding and handle removed, revealing the underlying components. The car seat 400 preferably comprises a single hard plastic shell 450. Suitable materials of construction for the hard shell include polypropylene.

Figure 21:
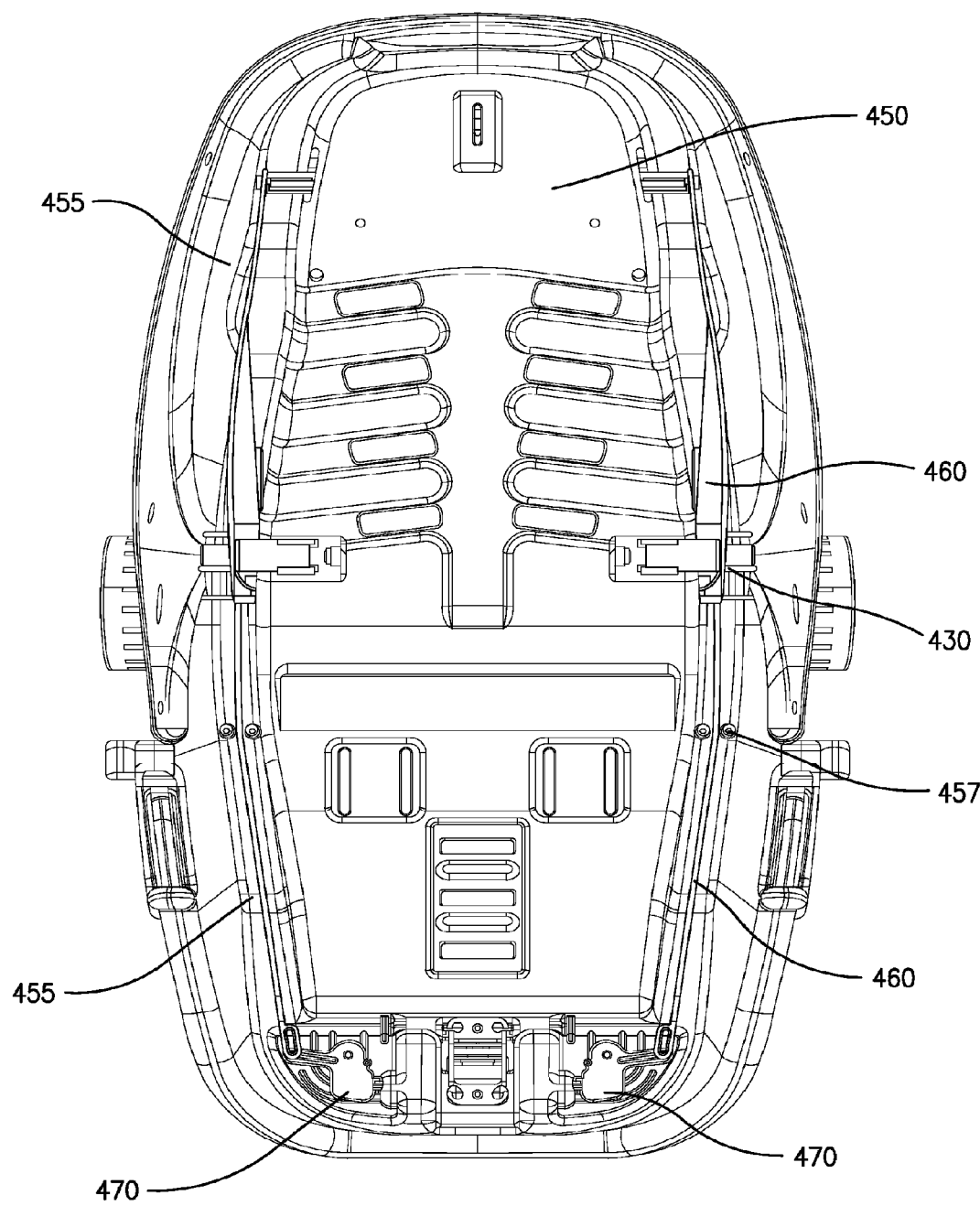
FIG. 21 shows a top view of the infant car seat of FIG. 20.

FIG. 21 shows a top view of the car seat of FIG. 20. In addition to the shell 450, an unlock mechanism 460 is shown extending from the head end 410 to the foot end 420. At the foot end 420, the unlock mechanism 460 attaches to rotatable tabs 470. As will be explained in more detail later, these tabs 470 rotate when the unlock mechanism 460 is engaged, thereby disconnecting the car seat 400 from the base 100. The unlock mechanism 460 is preferably located along the outer portion of the shell 450, so that it is not impeded by the weight of the infant resting on it. In some embodiments, the shell 450 has one or more channels 455 along the outer edge, such that the unlock mechanism 460 sits within the channels 455. In addition, alignment means, such as alignment pins 457, are positioned within the channel 455 to hold the unlock mechanism 460 in place.

Figure 22:
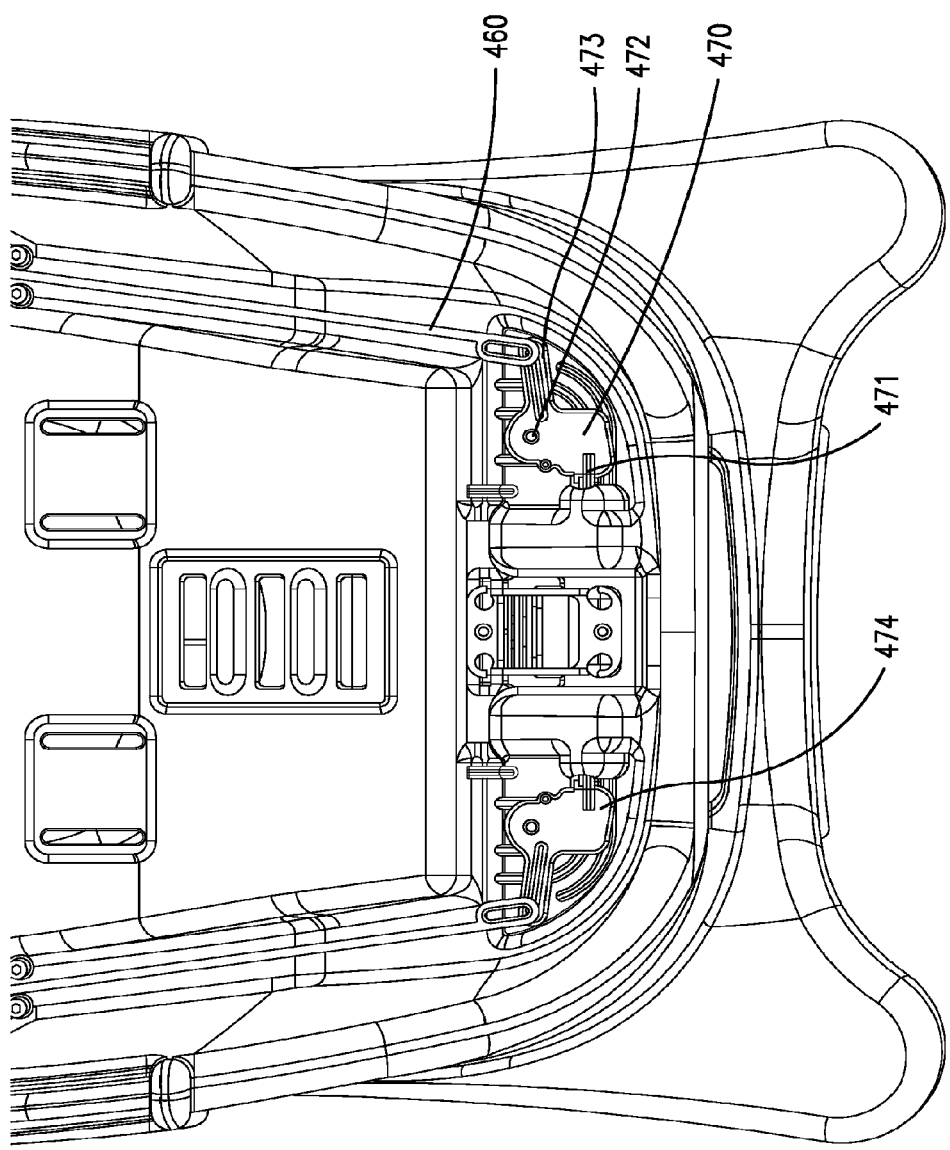
FIG. 22 shows an expanded view of one embodiment of the locking mechanism of the infant child restraint system.

FIG. 22 shows an expanded view of one embodiment of the rotatable tabs 470 and their connection to the unlock mechanism 460. The tabs 470 are rotatably affixed to the car seat at pivots 472. The unlock mechanism 460 attaches to the tab via elongated arm 473. In the locked position, a locking portion 474 of tab 470 is lockingly positioned under metal tab 471. As can be better seen in FIG. 23, the metal tab 471 is attached to the base plate 100. The upper edge 476 of each metal tab 471 is angled to facilitate the locking process. Below the angled portion 476 is a notched area 477. A locking portion 474 of the tab 470 is lockingly engaged in this notched area 477 when in the locked position. The locking portion 474 of the tab 470 and the elongated arm 473 are located on opposite sides of the pivot point 472. In this configuration, an upward movement of the unlock mechanism 460 causes an outward rotation of the locking portion 474 of the tab 470 away from metal tab 471. The specific shape of the tab 470 can vary, in that the locking portion 474, the pivot 472 and the elongated arm 473 must all be present, however, their sizes and orientation with respect to each other can vary. Tab 470 can be made from various materials, including but not limited to metal, or hard plastic. Although the tab 471 is preferably metal and is referred to as the metal tab, other material can also be used for its construction.

Returning to FIG. 22, the locking process will be described. When the car seat 400 is properly positioned about the base 100, the tabs 470, and specifically the locking portions 474, will be aligned with the metal tabs 471. When the car seat is pushed downward, the tabs 470 press against the angled portions of the metal tabs 471. These angled portions 476 urge the tabs 470 to rotate away from the metal tab 471.

Note that the tabs 470 necessarily rotate in opposite directions with respect to each other due to the symmetric nature of the design. As the tab 470 rotates, the unlock mechanism 460 (which does not move during the locking process) slides along the elongated arm 473, thereby offering little resistance to this rotation. Once the car seat has been pressed down far enough, the locking portion 474 of the tab 470 moves past the angled portion 476 and reaches the notch area 477. A biasing element, such as a spring (not shown), urges the tabs 470 to rotate back, thereby moving the locking portion 474 into the notched area 477, holding the car seat in place.

To disengage the car seat from the base, the user urges the unlock mechanism 460 toward the head end 410. This action causes the unlock mechanism 460 to pull the elongated arms toward the head end 410. This causes tabs 470 to rotate about pivots 472 and release the locking portions 474 of the tabs 470 from beneath metal tabs 471.

Figure 23:
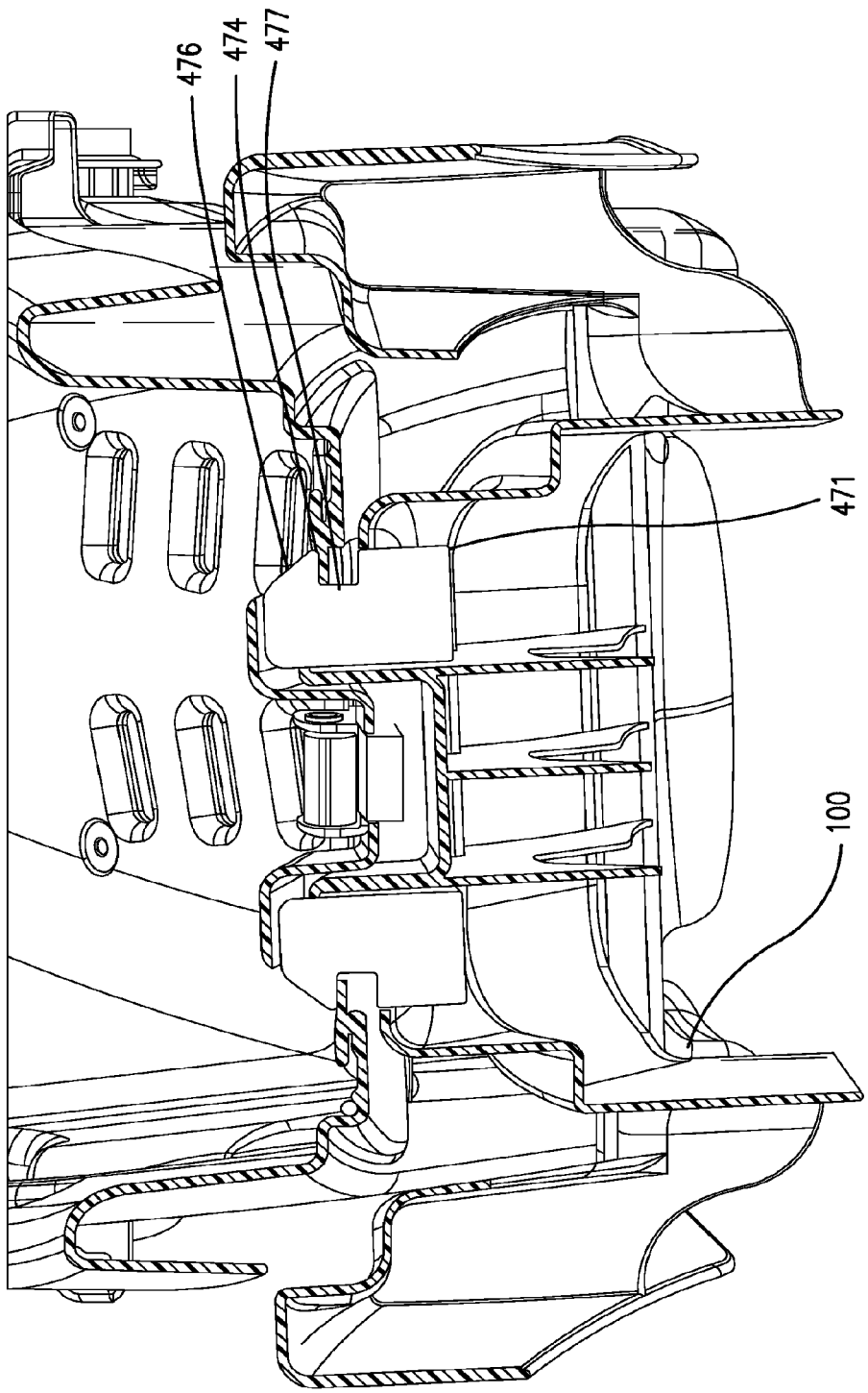
FIG. 23 shows a cross sectional view of the locking mechanism of FIG. 22.

Since the tabs 470 rotate in opposite directions relative to each other to release the car seat, this locking mechanism is not vulnerable to premature or improper release from forces, regardless of the direction of those forces. Impacts from the side may cause the car seat to move laterally relative to the base. Referring to FIG. 23, assume the car seat is forced left relative to the base. This action will tend to push the tab 470 on the left side of the drawing away from the metal tab 471. However, this action also serves to push the tab 470 on the right side deeper into the notch 477, thereby continuing to hold the car seat in place. Similarly, a force to the right would cause a reversal of the impact on each tab. Note also that this mechanism is designed to have no susceptibility to front or backward motion, since the tabs cannot be moved in these directions.

Figure 24:
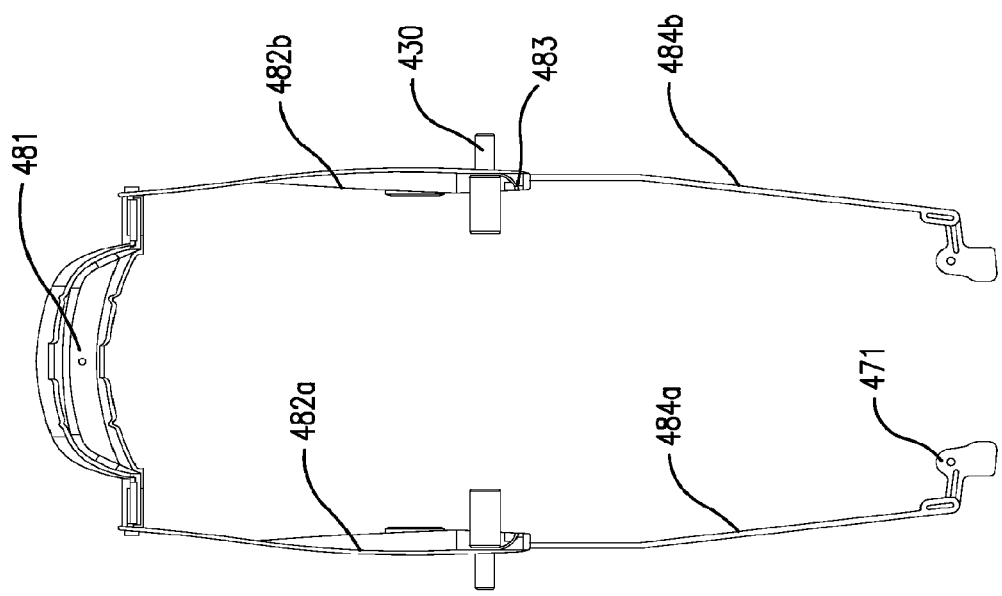
FIG. 24 shows the unlock mechanism of FIG. 22 in isolation.

FIG. 21 shows the car seat with the padding removed, so that the unlock mechanism 460 is visible. FIG. 24 shows the unlock mechanism 460 outside of the car seat. The unlock mechanism 460 has a release handle 481, which the user grasps and pulls to engage the mechanism 460. Attached to the release handle 481 are two upper members 482*a,b*. These upper members 482 are enclosed within the head end of the car seat. The upper members 482 attach to two lower members 484*a,b*, which are enclosed in the foot end 420. Between the upper and lower members are the connection points 430. As described earlier, lower members 484 terminate in a connection to tabs 470. In some embodiments, the release handle 481 and upper members 482*a,b* are integral, while in other embodiments, these parts are separate components. Similarly, upper members 482*a,b* and lower members 484*a,b* may be integral, or may be separate components.

Figure 44:
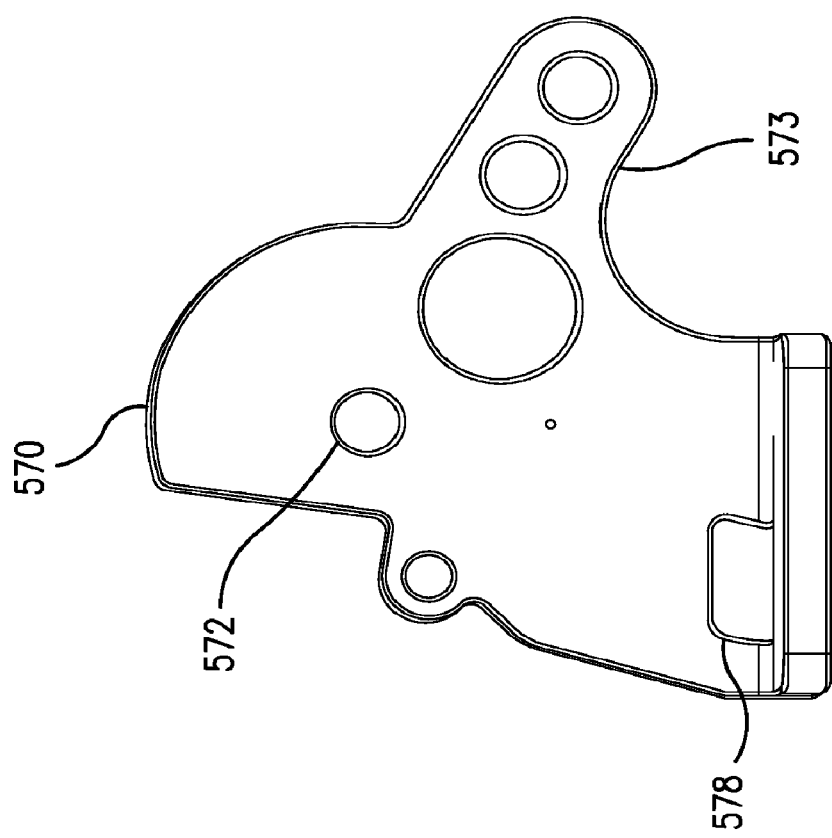
FIG. 44 shows an expanded view of one embodiment of the locking mechanism of the infant child restraint system.
Figure 45:
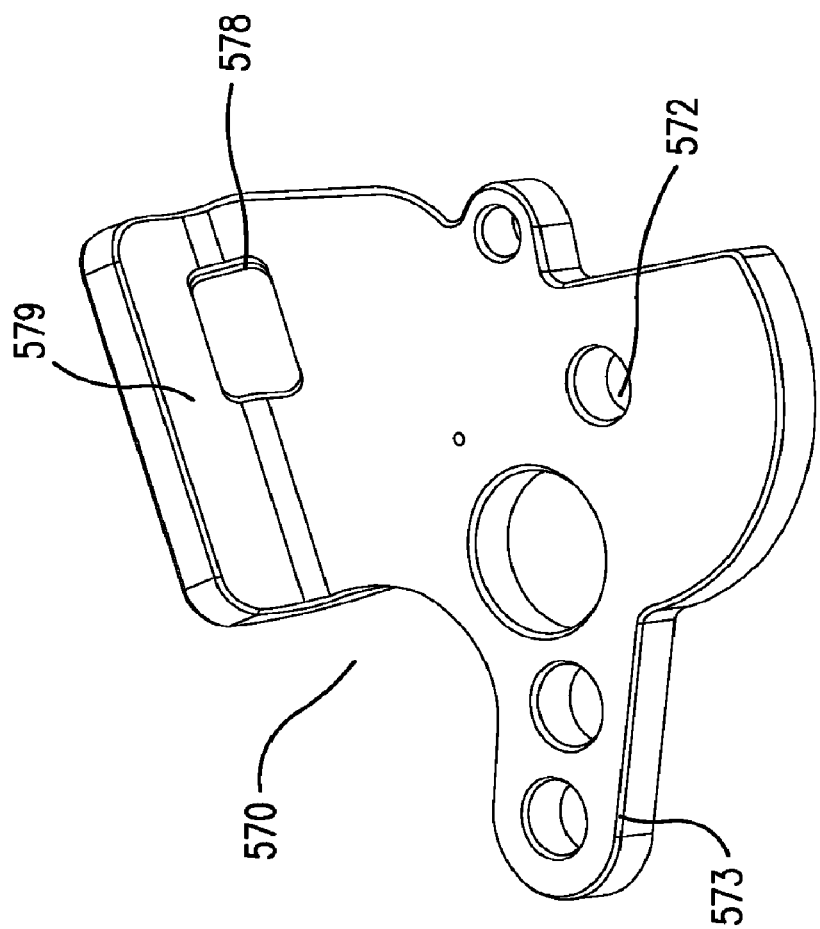
FIG. 45 shows another view of the locking mechanism of FIG. 44.

FIGS. 44 and 45 shows a second embodiment of the tab 570. This tab is similar to tab 470, with several exceptions. Tab 570, as seen in FIGS. 44 and 45, has an opening 578 near the locking portion 574. This opening 578 is used in conjunction with the metal tab 571 (see FIG. 46), as will be described below. Similar to tab 470, tab 570 has an elongated arm 573 which attaches to lower member 484*a,b*. The tabs 570 are rotatably affixed to the car seat at pivots 572. The unlock mechanism 460 attaches to the tab via elongated arm 573.

FIG. 45 shows a perspective view of tab 570. In this embodiment, tab 570 is not flat, but has a turned up edge 579. The opening 578 is close to the turned up edge 579. In other embodiments, the tab is flat, but has an opening 578.

Figure 46:
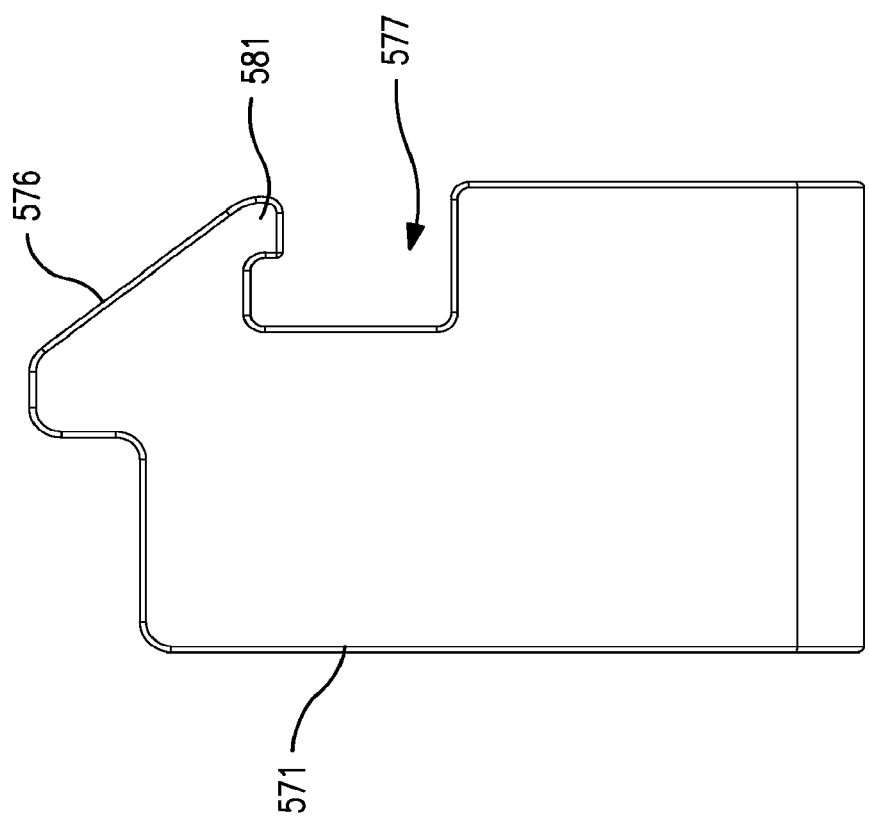
FIG. 46 is a second embodiment of the hook located on the base.

FIG. 46 shows the metal tab 570. The upper edge 576 of each metal tab 570 is angled to facilitate the locking process. Below the angled portion 576 is a notched area 577. The locking portion 574 of the tab 570 is lockingly engaged in this notched area 577 when in the locked position. The locking portion 574 of the tab 570 and the elongated arm 573 are located on opposite sides of the pivot point 572. In this configuration, an upward movement of the unlock mechanism 460 causes an outward rotation of the locking portion 574 of the tab 570 away from metal tab 570. Metal tab 570 also has a downward projection 581 located at the upper region of the notched area 577.

Figure 47:
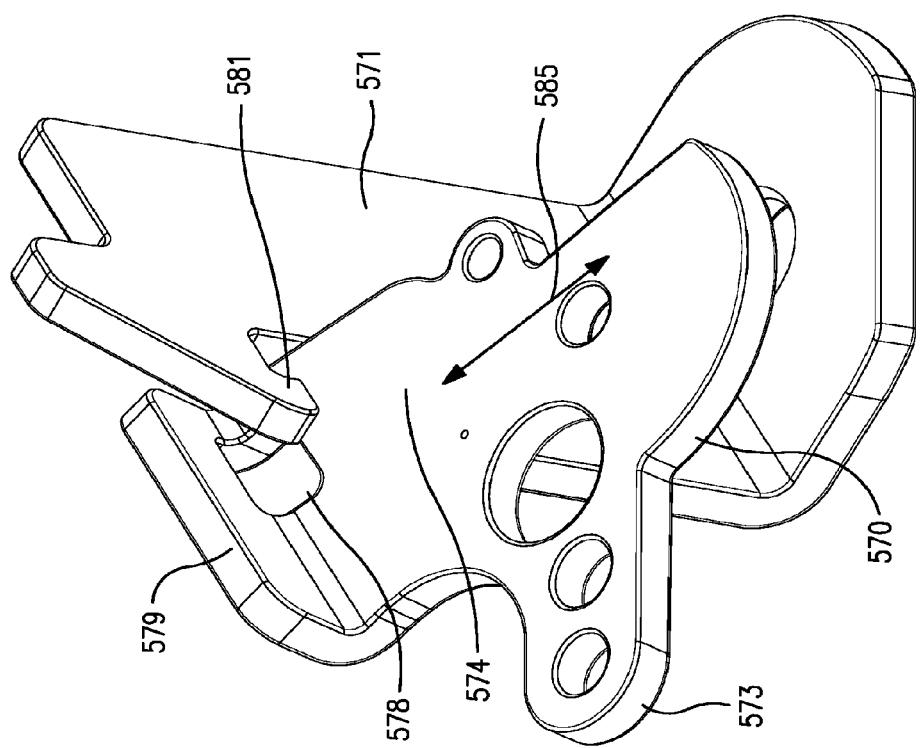
FIG. 47 shows the tab and hook of the second embodiment in the normal locked position.

In normal operation, this downward projecting hook 581 rests on the locking portion 574 of tab 570, as shown in FIG. 47. In this mode, the downward projecting hook 581 does not contact turned up edge 579 or opening 578 in the metal hook 571. Tab 570 rotates as described above.

However, in the event of a collision, it is possible that the tab 570 and metal hook 571 may move relative to each other. For example, in the event of a head-on collision, the two components may move relative to each other. In one embodiment, the hook 571 moves forward (i.e. into the page along direction 585), while tab 570 moves in the opposite direction. Without a mechanism to stop this relative motion, the hook and tab may disengage (for example, see FIG. 22, where tab 471 is flat).

Figure 48:
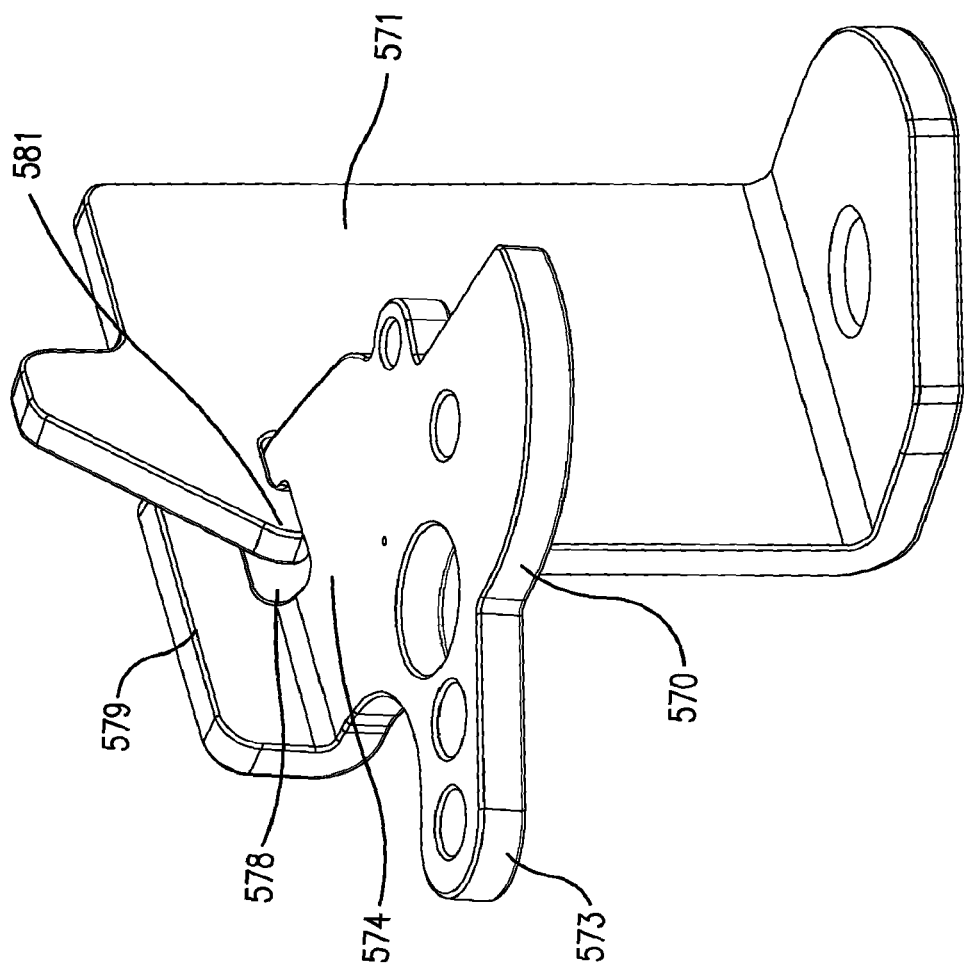
FIG. 48 shows the tab and hook of the second embodiment in a secondary locked position in the event of an accident.

Therefore, in this embodiment, the turned up edge 579 and opening 578 serve as a secondary locking mechanism. FIG. 48 shows how the tab 570 and the metal hook 571 interlock in the event of relative motion between them. In this embodiment, the downward projection 581 slides into opening 578. Since metal hook 571 is biased downwardly, the projection 581 moves down and effectively "snaps" into the opening 578. The turned up edge 579 is simply to insure that the hook 571 does not slide past the tab 570 before the projection 581 catches the opening 578. In some embodiments, the turned up edge 579 may not be needed.

Figure 25:
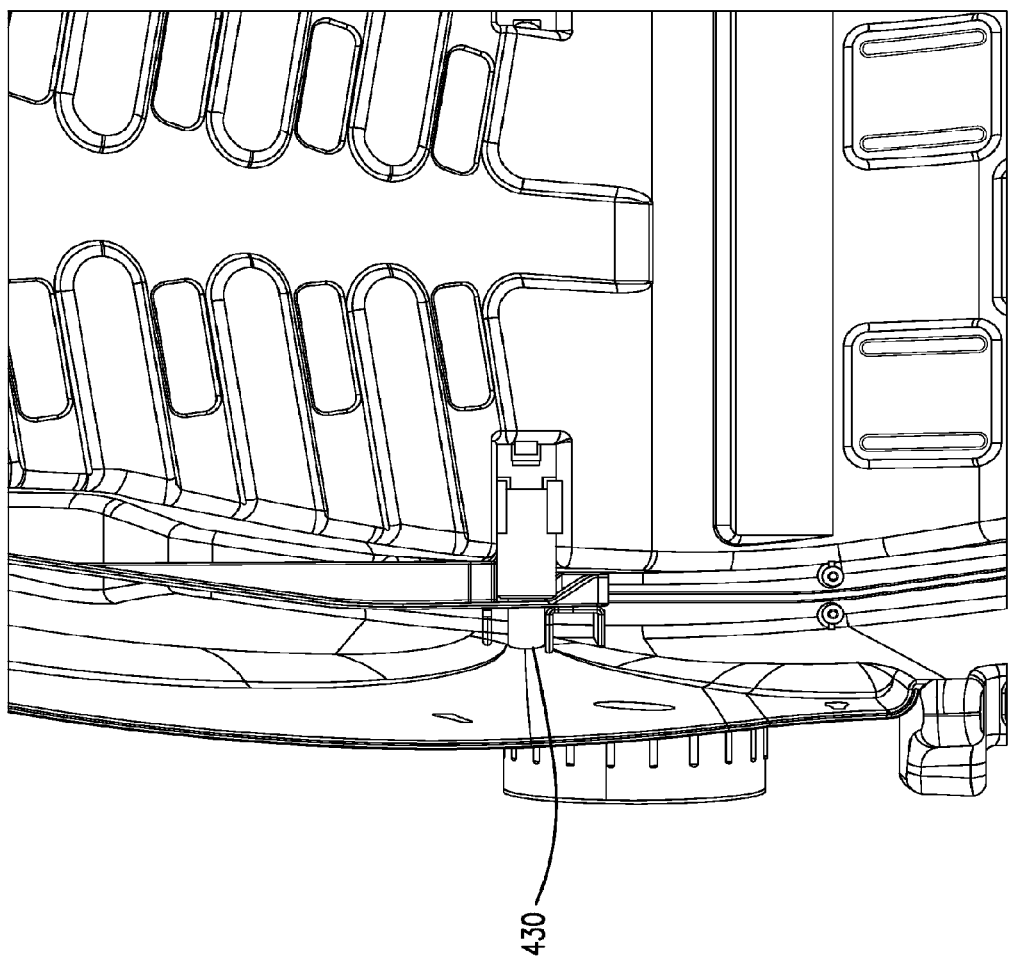
FIG. 25 shows the unlock mechanism of FIG. 22 within the infant car seat.
Figure 26:
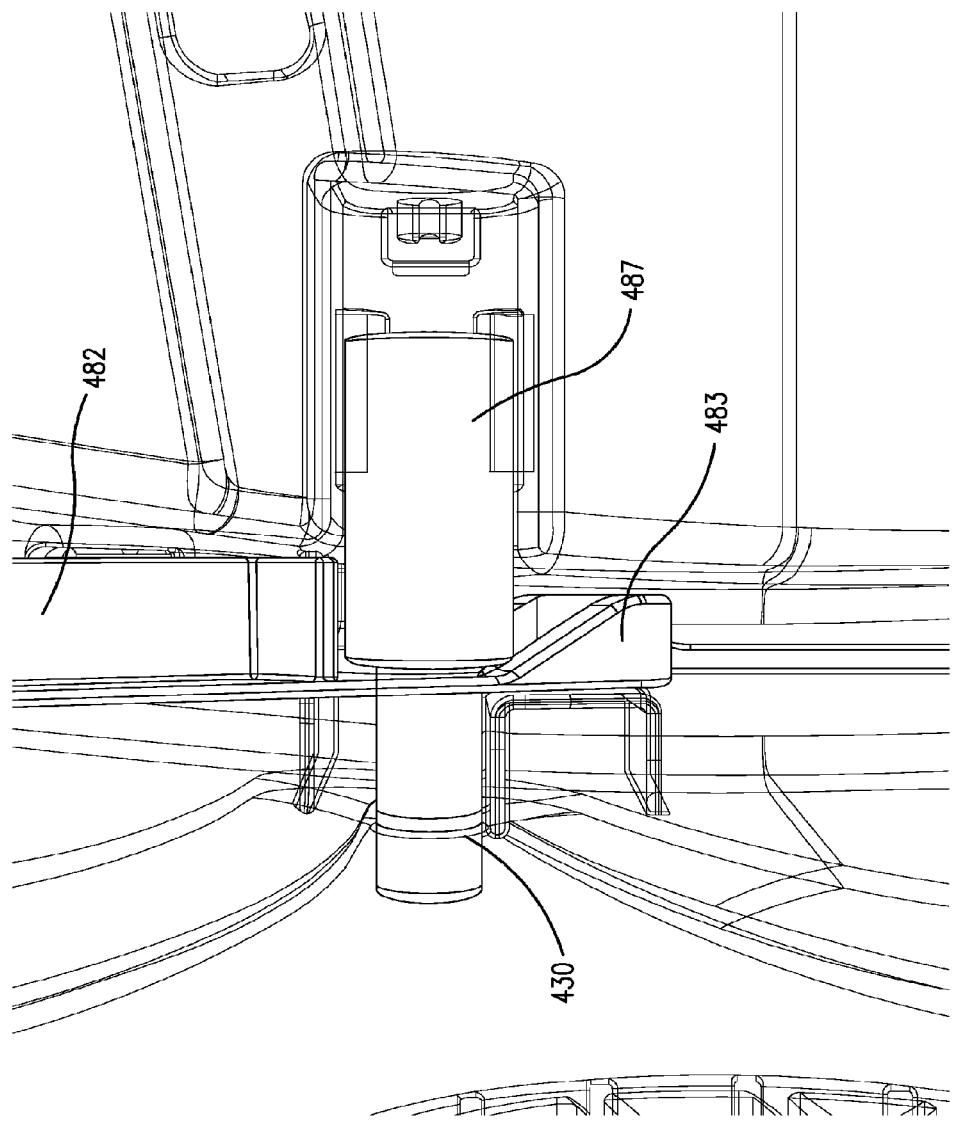
FIG. 26 shows an expanded view of the unlock mechanism shown in FIG. 25.

FIG. 25 shows an expanded view of the unlock mechanism 460 near the connection point 430. As described earlier, the connection point 430 allows the car seat to attach to the stroller or other apparatus that has cooperating notches or recesses 137. FIG. 26 shows an expanded view of FIG. 25. The upper member 482 connects to a ramped portion 483. When the upper member 482 is moved upwardly or axially (toward the head end), it brings the ramped portion 483 upward toward the head end. This causes the ramped portion 483 to push against cylindrical member 487. As a result, cylindrical member 487 is urged radially inwardly, such that it causes connection point 430 to recede radially inwardly into the body of the car seat and disengage from the recesses 137 in the base, the stroller or other apparatus. This allows the car seat to be removed from the stroller. The cylindrical member 487 is normally biased to the radially extended position (shown in FIG. 26) by a biasing member, such as a spring (not shown). Thus, when the upper member 482 is released and returned to its rest position, the cylindrical member 487 moves back to the radially extended position.

Figure 27:
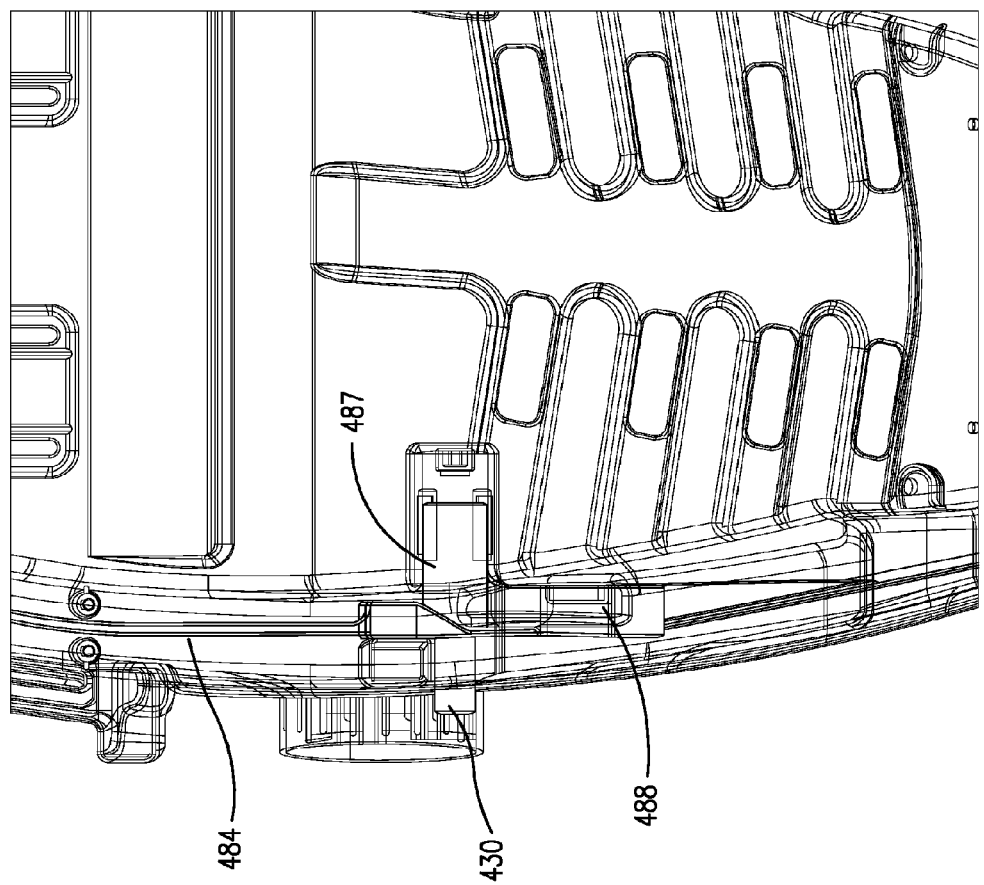
FIG. 27 shows another view of the unlock mechanism of FIG. 22.
Figure 28:
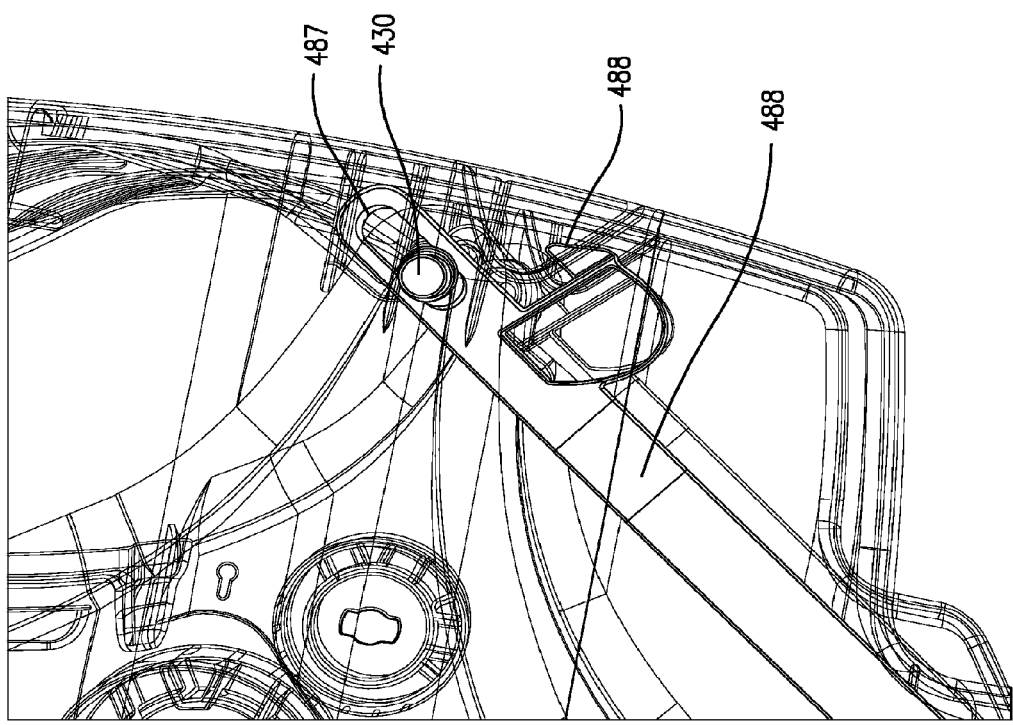
FIG. 28 shows a side view of the connection point.
Figure 29:
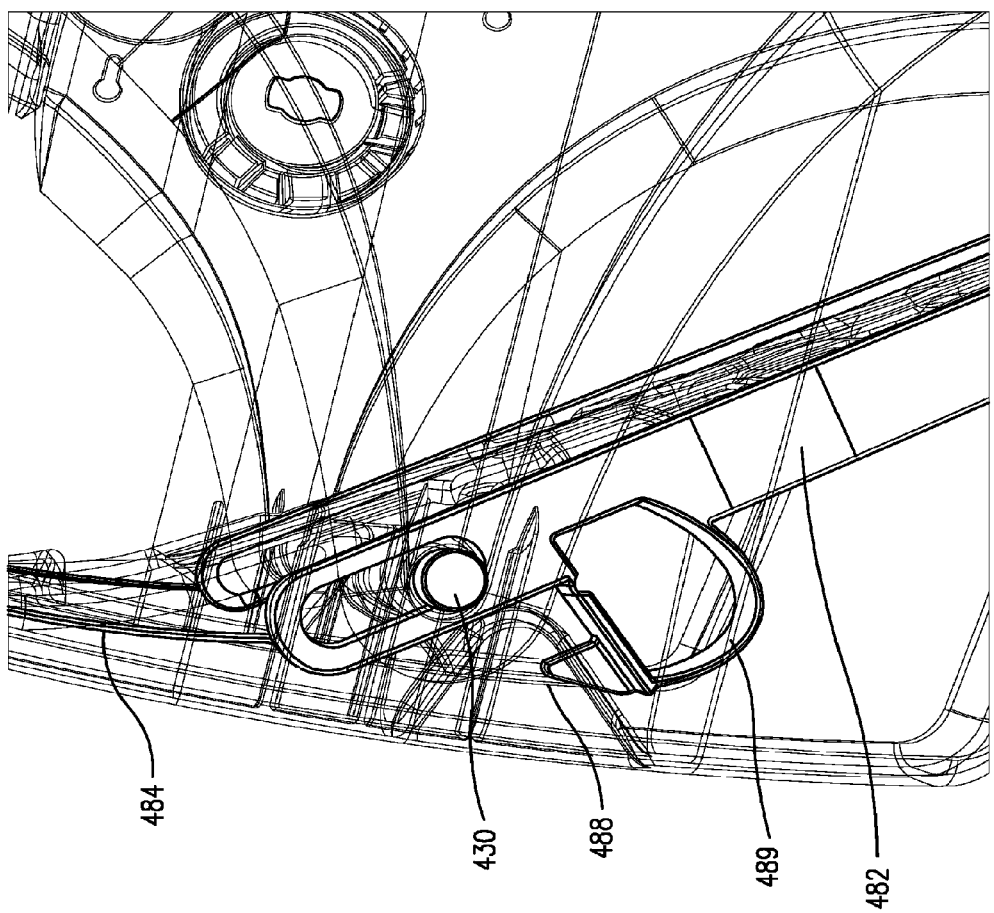
FIG. 29 shows a side view of the connection point.

FIG. 27 shows a bottom view of the car seat in the area of the connection point 430. In addition to the connection point 430, a claw 488 optionally extends downwardly from the bottom of the car seat. FIG. 28 shows an expanded side view of this optional feature. When upper member 482 is in its natural rest position, connection point 430 extends radially from the body of the car seat. In addition, claw 488 extends outwardly from the bottom of the seat. This claw 488 engages with catch 120 (See FIG. 3). When the upper member 482 is pulled toward the head end, it causes the claw 488 to recede into the shell, thereby releasing the claw from the catch 120 and allowing the car seat to be removed from the base. In one embodiment, the upper members 482 terminate in elongated slots 487, through which the connection points 430 pass. FIG.

29 shows another view of this optional feature. Note that upper member 482 also includes a looped portion 489 to support the claw 488.

Figure 30:
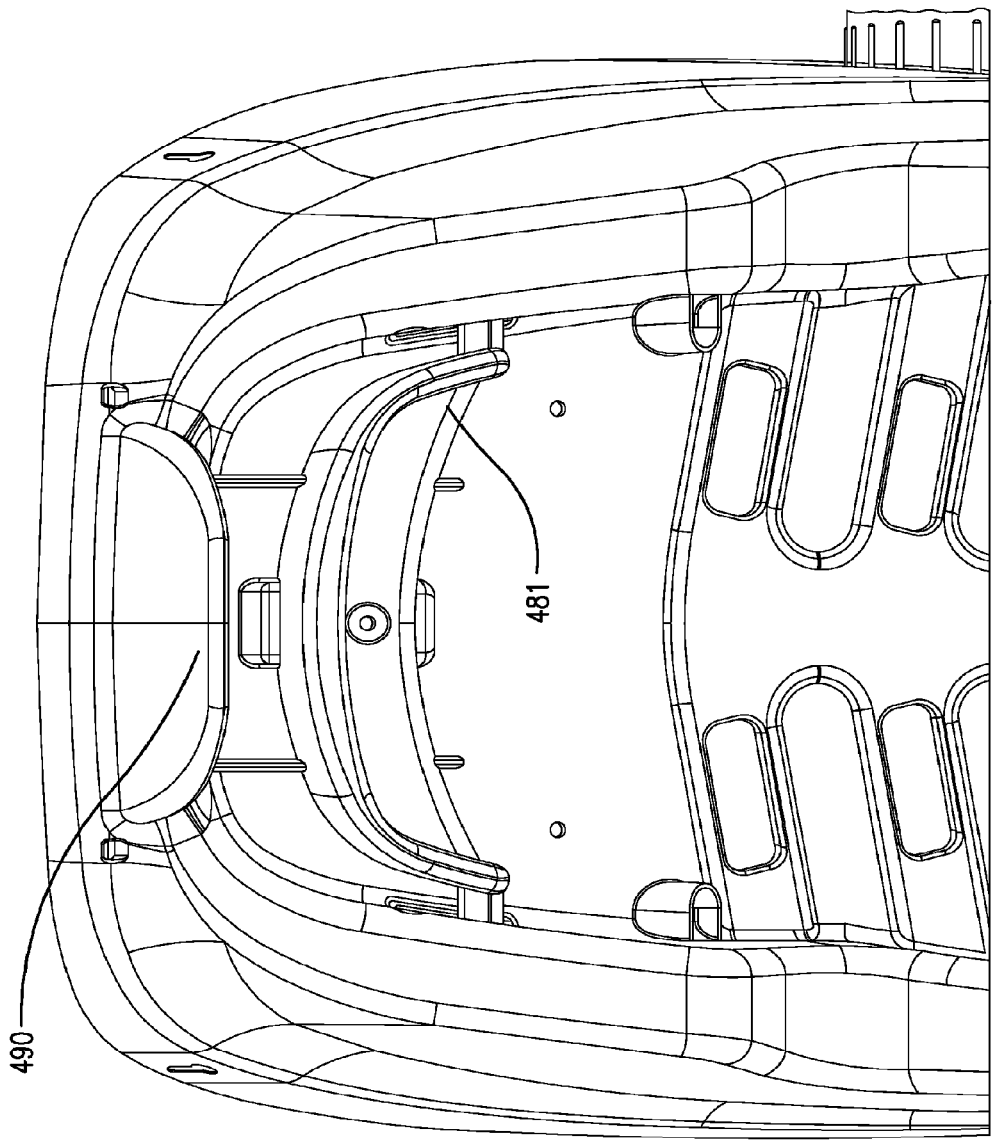
FIG. 30 shows the release handle for the unlock mechanism.
Figure 31:
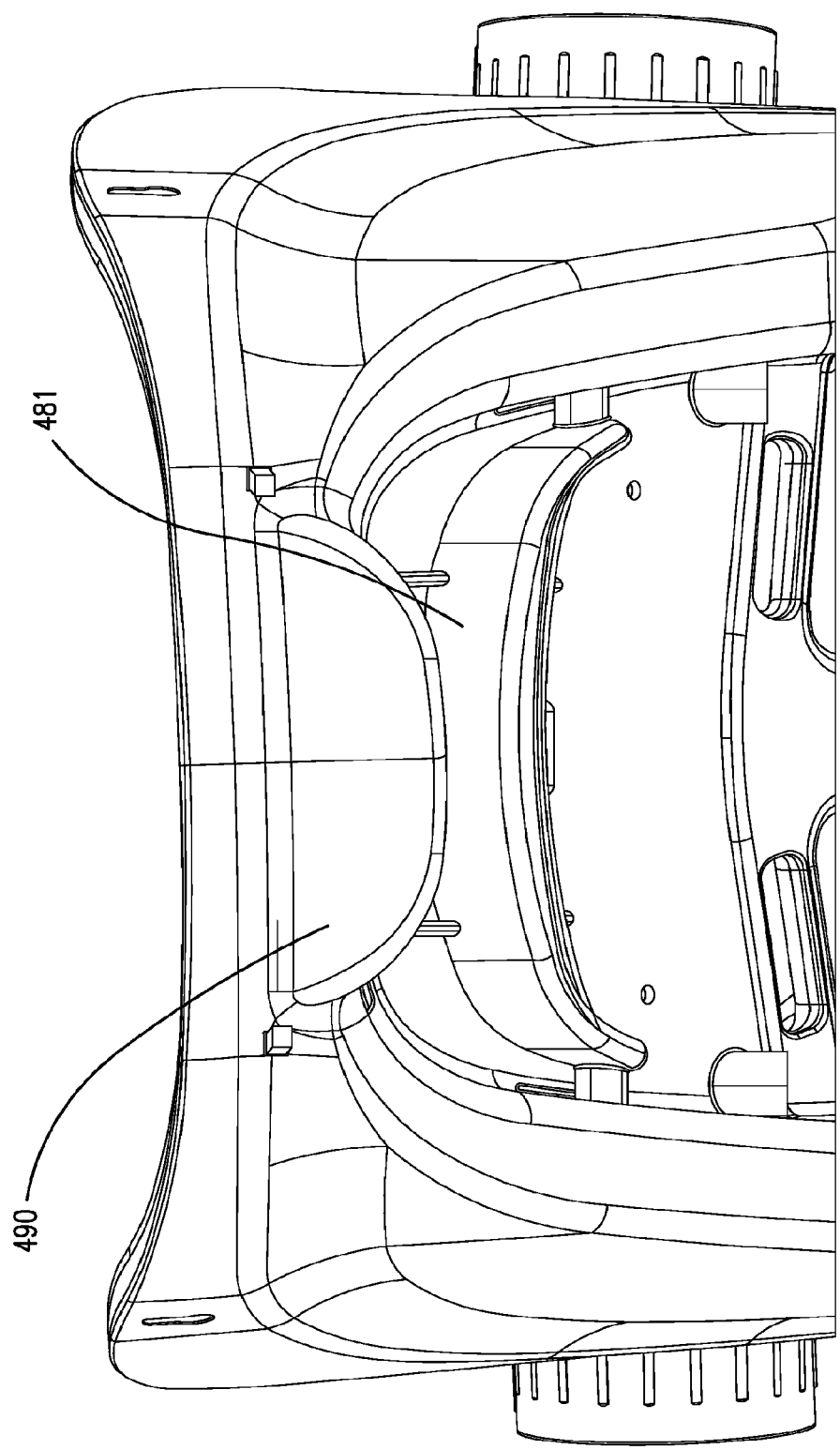
FIG. 31 shows a view of the release handle and lip.
Figure 32:
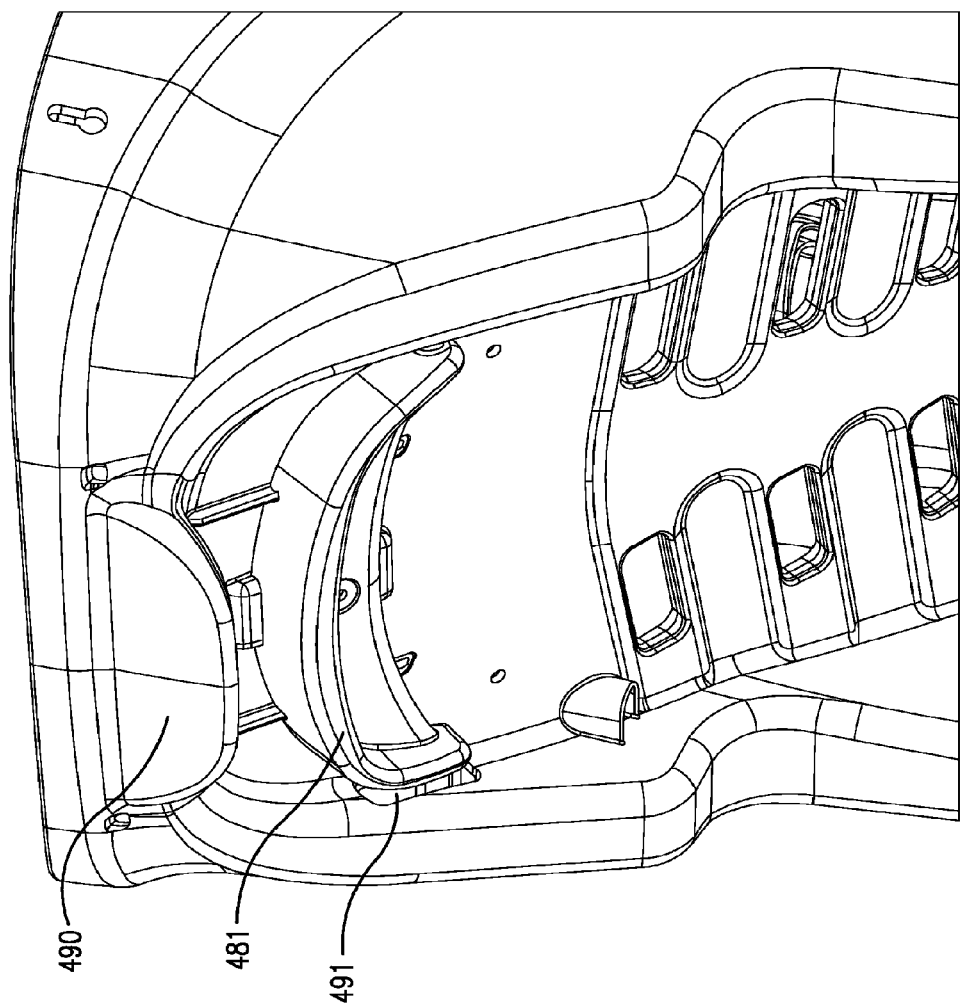
FIG. 32 shows another view of the release handle and lip.

FIG. 30 shows the release handle 481 of the unlock mechanism 460. The release handle 481 is located on the underside of the car seat. In one embodiment, a lip 490 is also located on the underside of the car seat and can be used as leverage to actuate the release handle 481. In this embodiment, the user may position their palm against the lip 490, with their fingers grasping the handle 481. By moving their fingers toward the palm, the release handle 481 is moved upward (axially), thereby actuating the unlock mechanism 460. FIGS. 31-32 show additional views of the lip 490 and release handle 481. FIG. 32 also shows an elongated opening 491 in the plastic shell that provides a track for the release handle. The release handle 481 is able to move up and down within this opening 491 via radially extending protrusions.

Figure 33:
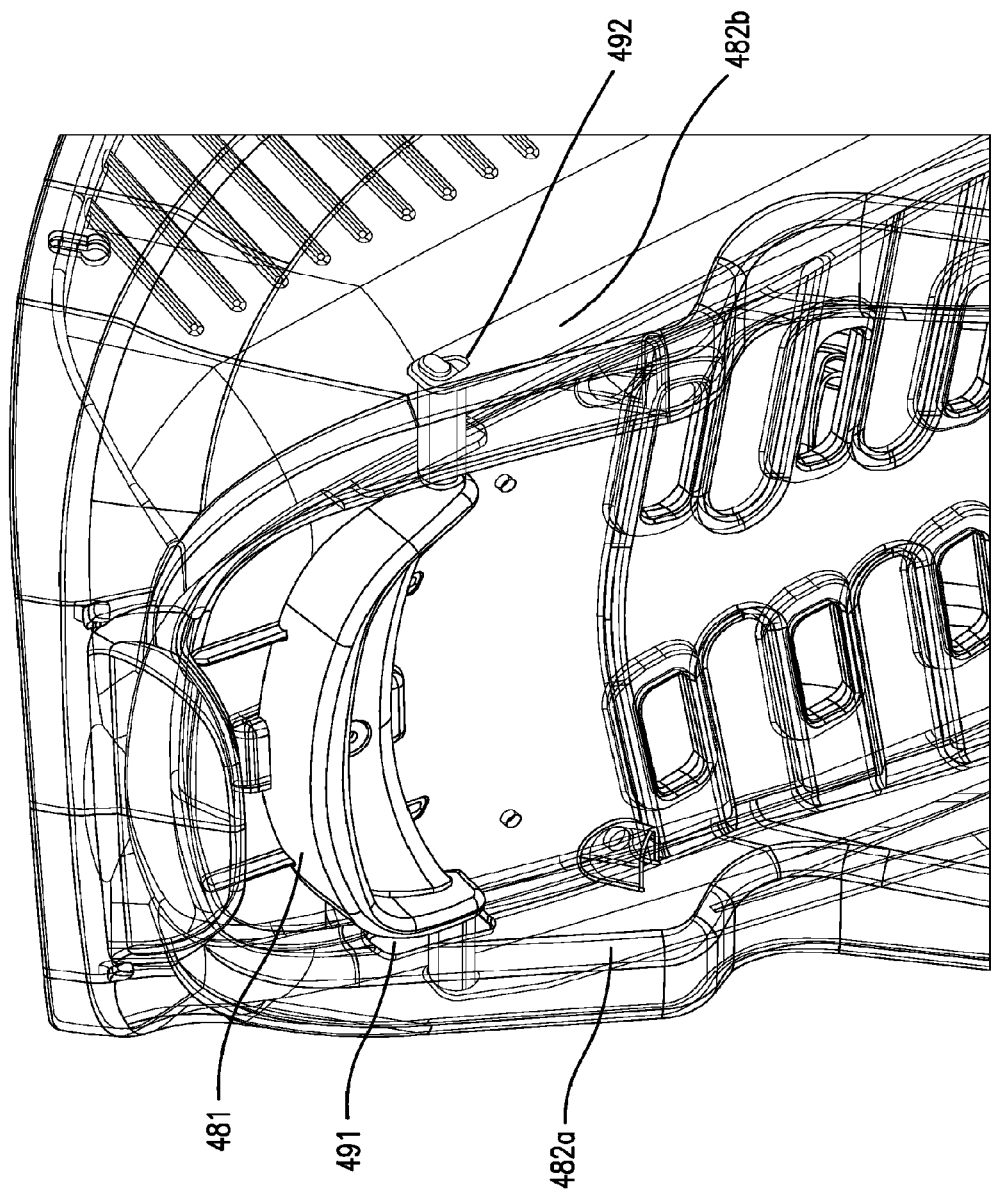
FIG. 33 shows a view of the release handle and upper members of the unlock mechanism.
Figure 34:
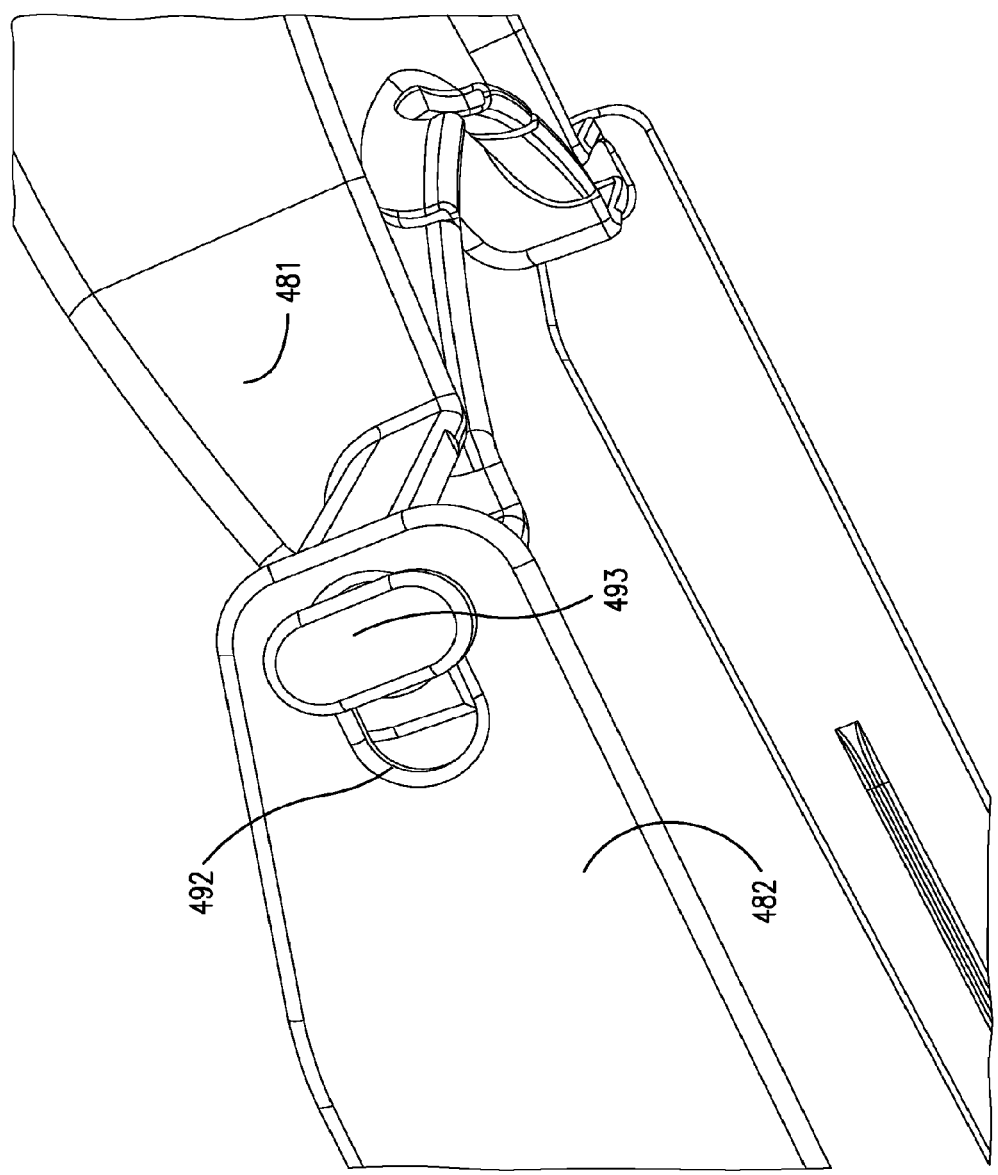
FIG. 34 shows an expanded view of the release handle and upper members.

FIG. 33 shows a view of the release handle 481 and its connection to upper members 482a,b. In this embodiment, the upper members 482a,b terminate with an aperture 492 at the end nearest the release handle 481. The radially extending protrusions of the release handle 481 pass through this aperture, thereby connecting the upper members to the release handle. In certain embodiments, shown in FIG. 34, the release handle 481 terminates in an oval shaped knob 493, having a shape and size similar to the aperture 492 in the upper member 482. To connect these pieces, the release handle 481 is held at a ninety-degree angle to its normal orientation, so that the knob 493 can pass through the apertures 492. Then, upon proper orientating the release handle 481, the knobs are rotated 90 degrees, preventing them from passing back through the apertures 492.

In other configurations, the release handle 481 and upper members 482 may be a unitary part. In still other embodiments, other fastening mechanisms are used to hold the release handle 481 and upper members 482 together.

Figure 35:
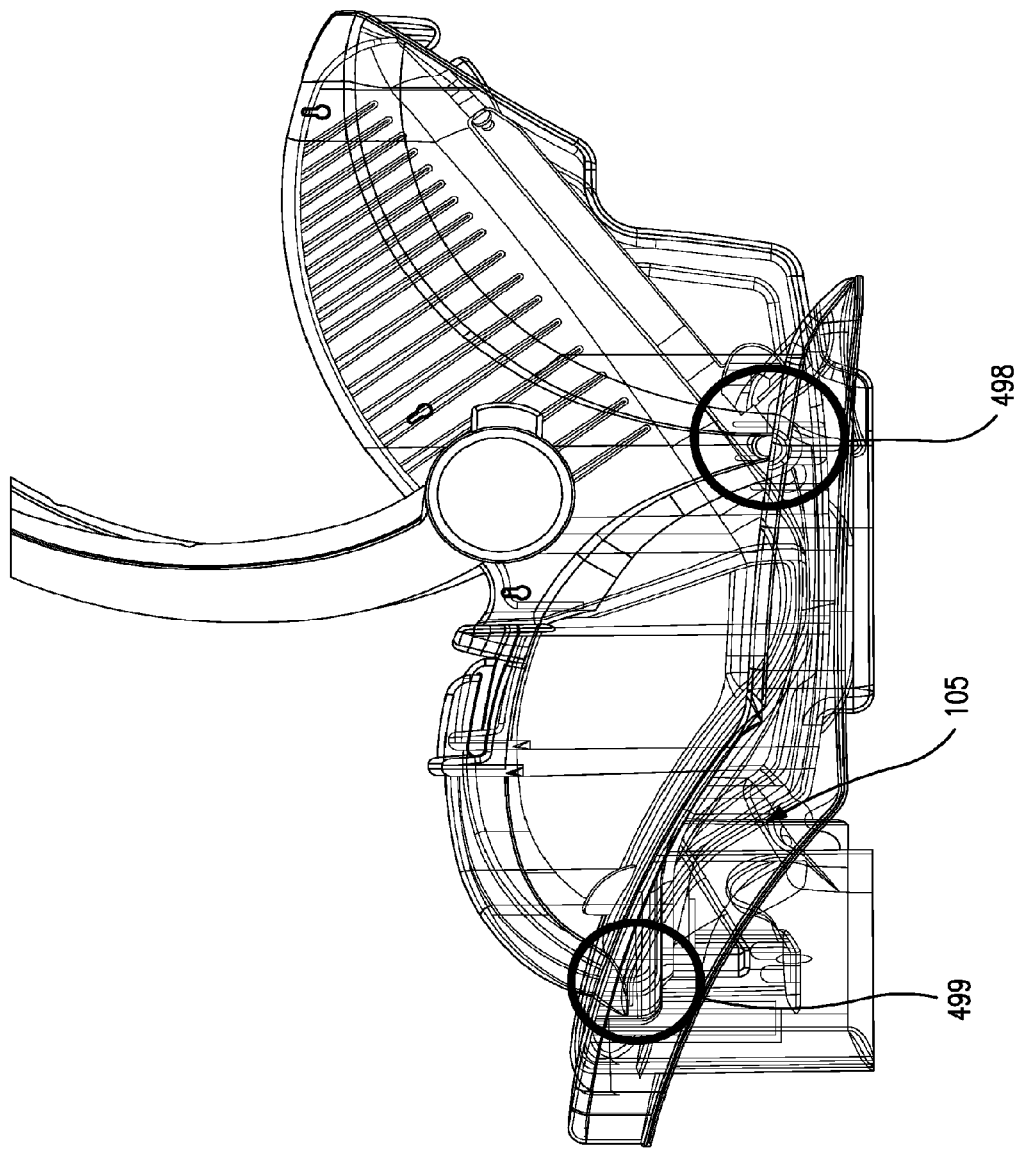
FIG. 35 shows the attachment points between the infant car seat and the base.

FIG. 35 shows a view of the car seat mounted to the base. In the embodiment shown, the two locations where the car seat attaches to the base are highlighted by circles 498 and 499. Note that belt guide 105 passes between two attachment areas 498, 499. This configuration gives the car seat and base added stability. Any sudden changes in speed of the vehicle in the forward or backward direction will necessary cause a force to be exerted on the infant child restraint system. By placing the belt guide 105 between the two attachment areas 498, 499, the rotation of the base 100 and seat about the axis created by the belt guide 105 is significantly reduced.

Figure 36:
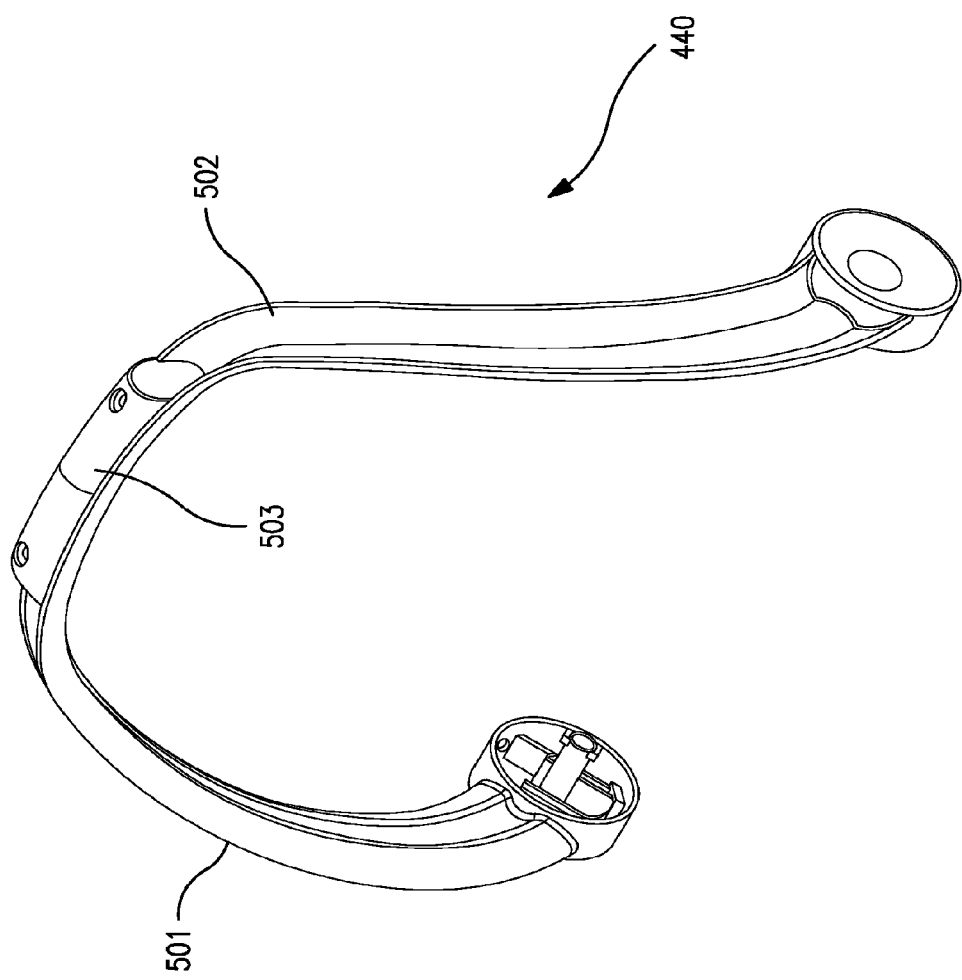
FIG. 36 shows the handle used with the infant child restraint system.

In many prior art systems, the handle is smooth on three sides, with an exposed side, typically containing ribs for strength. Handles are traditionally made this way due to the complexity of molding a unitary part with four smooth surfaces. However, these conventional handles can be unsightly, when viewing this exposed side. FIG. 36 shows the handle 440 used with the infant child restraint system. ment, such as a spring (not shown), urges the tabs 470 to rotate back, thereby moving the locking portion can be seen in better detail in the following figures, the left handle 501 and right handle 502 are concave in shape, and do not have any exposed sides.

Figure 37:
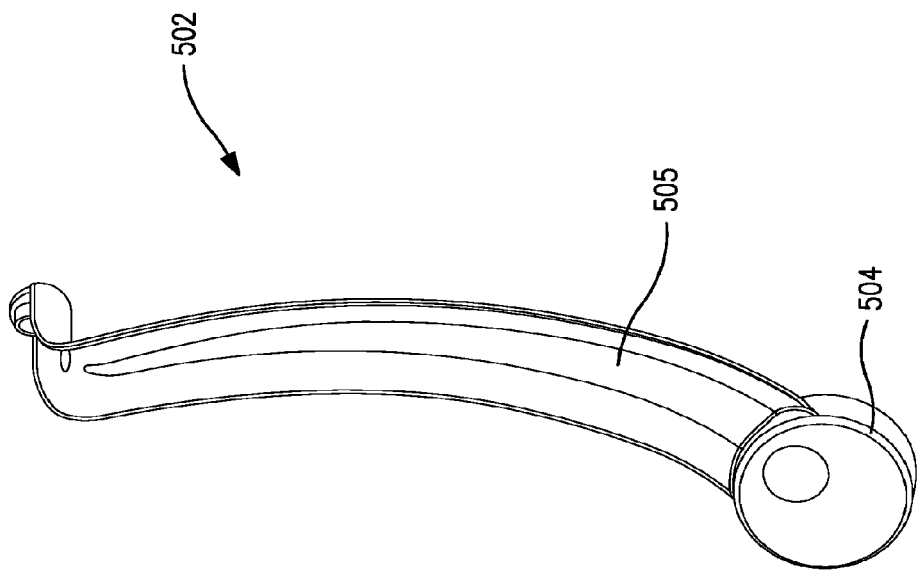
FIG. 37 shows the outside view of right handle.

FIG. 37 shows the outside view of right handle 502. The lower portion of the handle ends at a cylindrical structure 504, adapted to connect to the car seat. The outside edge 505 of the handle 502 has a generally concave shape. The handle 502 also has a curvilinear shape.

Figure 38:
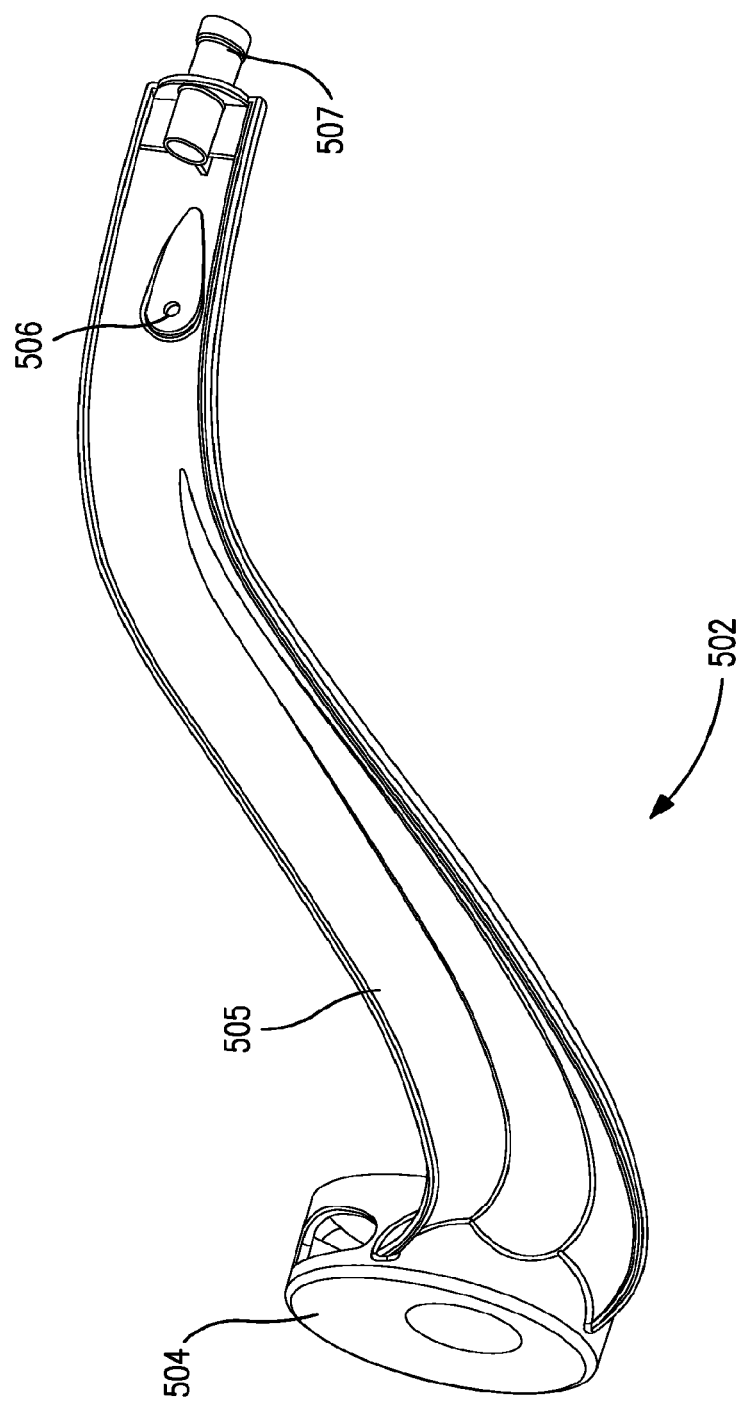
FIG. 38 shows a top view of right handle.

FIG. 38 shows a top view of right handle 502. The concave shape of the outside edge 505 is visible, especially at the point where the handle meets the cylindrical structure 504. The distal end of the right handle 502 includes a fastening hole 506, and a handle attachment mechanism 507, for attaching the right handle 502 to the left handle 501.

Figure 39:
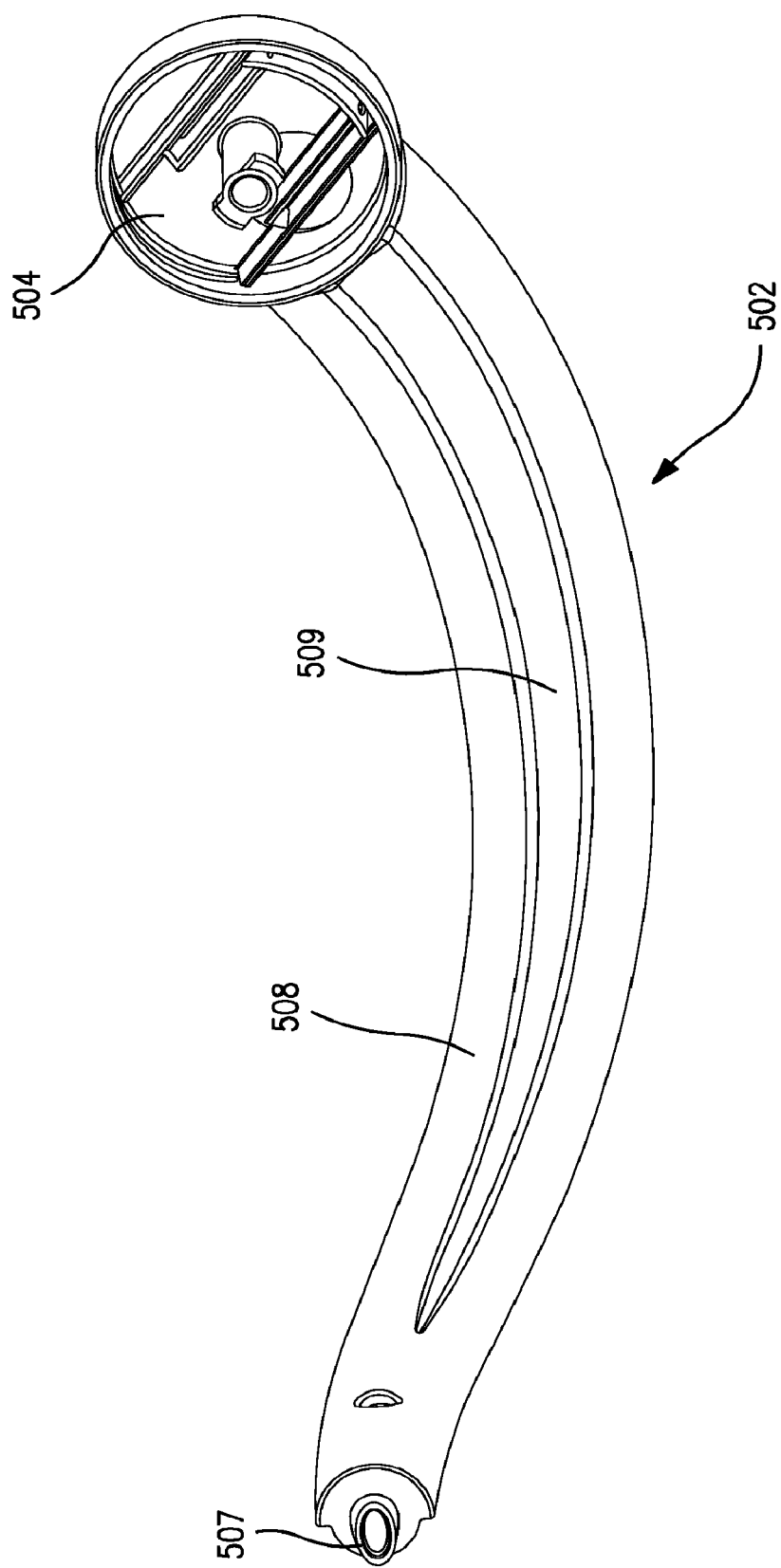
FIG. 39 shows a view of the inner edge of the right handle.

FIG. 39 shows a view of the inner edge 508 of the right handle 502. Note that the inner edge 508 also has a concave portion 509. In this embodiment, the handle attachment mechanism 507 includes an oblong tab, which is adapted to mate with a similarly shaped opening in the left handle 501. To join these parts, the oblong tab 507 is inserted through the oblong opening in the left handle 501. In the preferred embodiment, the tab and opening are offset by about 90° from one another. This orientation allows the handles are rotated with respect to each other to lock them together.

Figure 40:
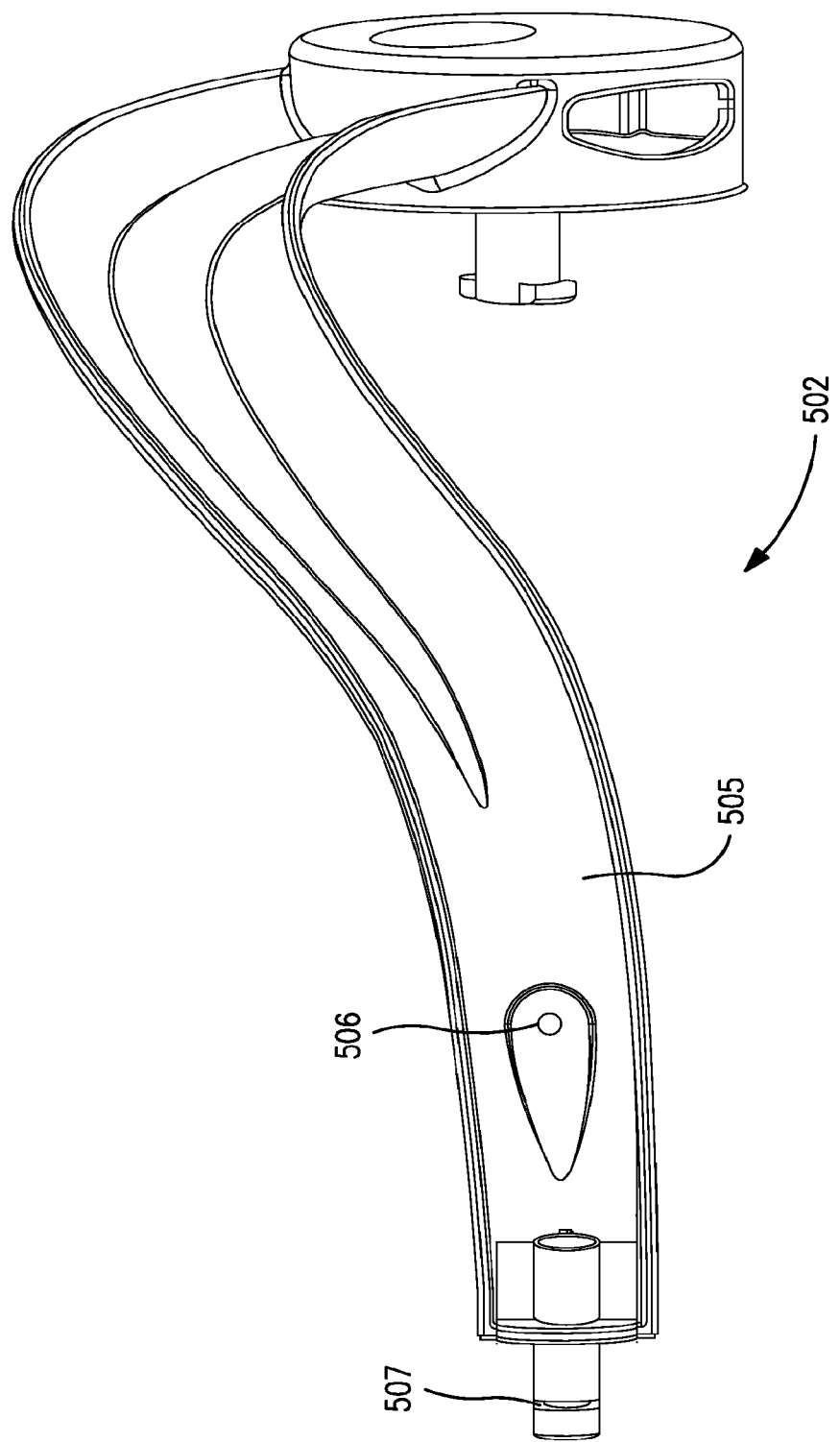
FIG. 40 shows a top view of the right handle.

FIG. 40 shows a top view of the right handle 502. The fastening hole 506 and handle attachment mechanism 507 are shown. The concave shape of outside edge 505 is also visible.

Figure 41:
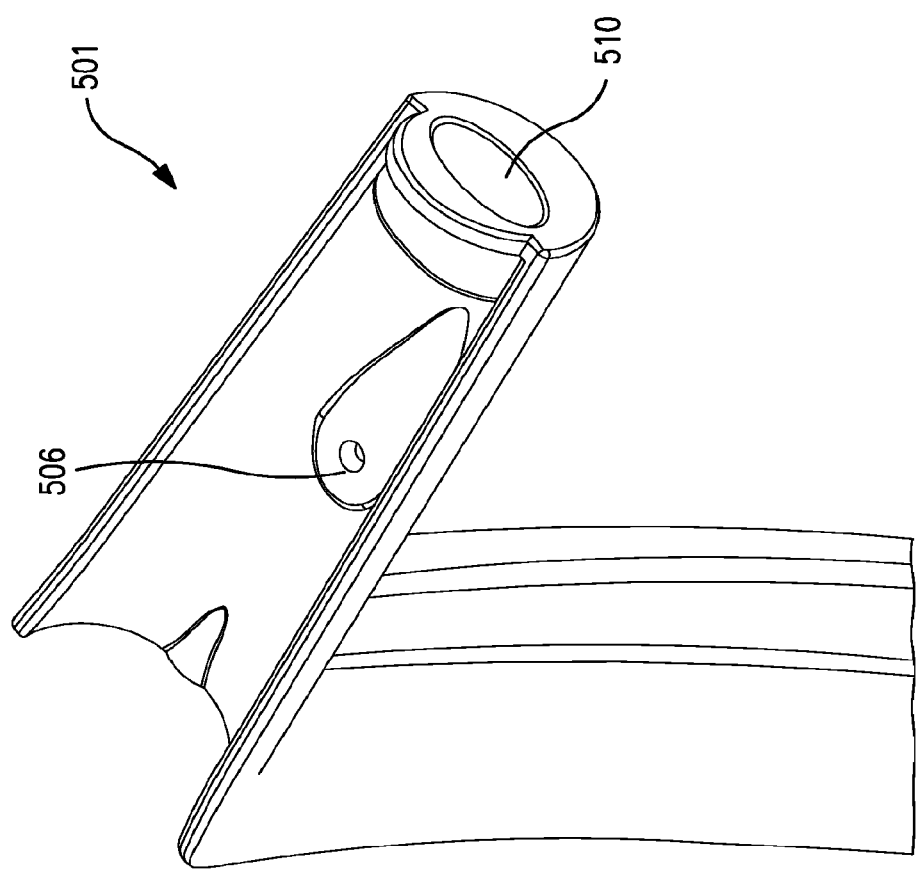
FIG. 41 shows an expanded view of the handle attachment mechanism of left handle.

FIG. 41 shows an expanded view of the handle attachment mechanism 510 of left handle 501. As described above, in one embodiment, the tab 507 is oblong and mates to a corresponding oblong hole in the left handle 501. Although an oblong, or oval shaped, tab and opening are shaped in the figures, other shapes are possible. Any non-symmetrical shape can be used. For example, a rectangular shaped tab and opening can also be employed, where the rectangular tab is preferably oriented 90° relative to the rectangular opening. This arrangement allows the two handles to lock together.

Figure 42:
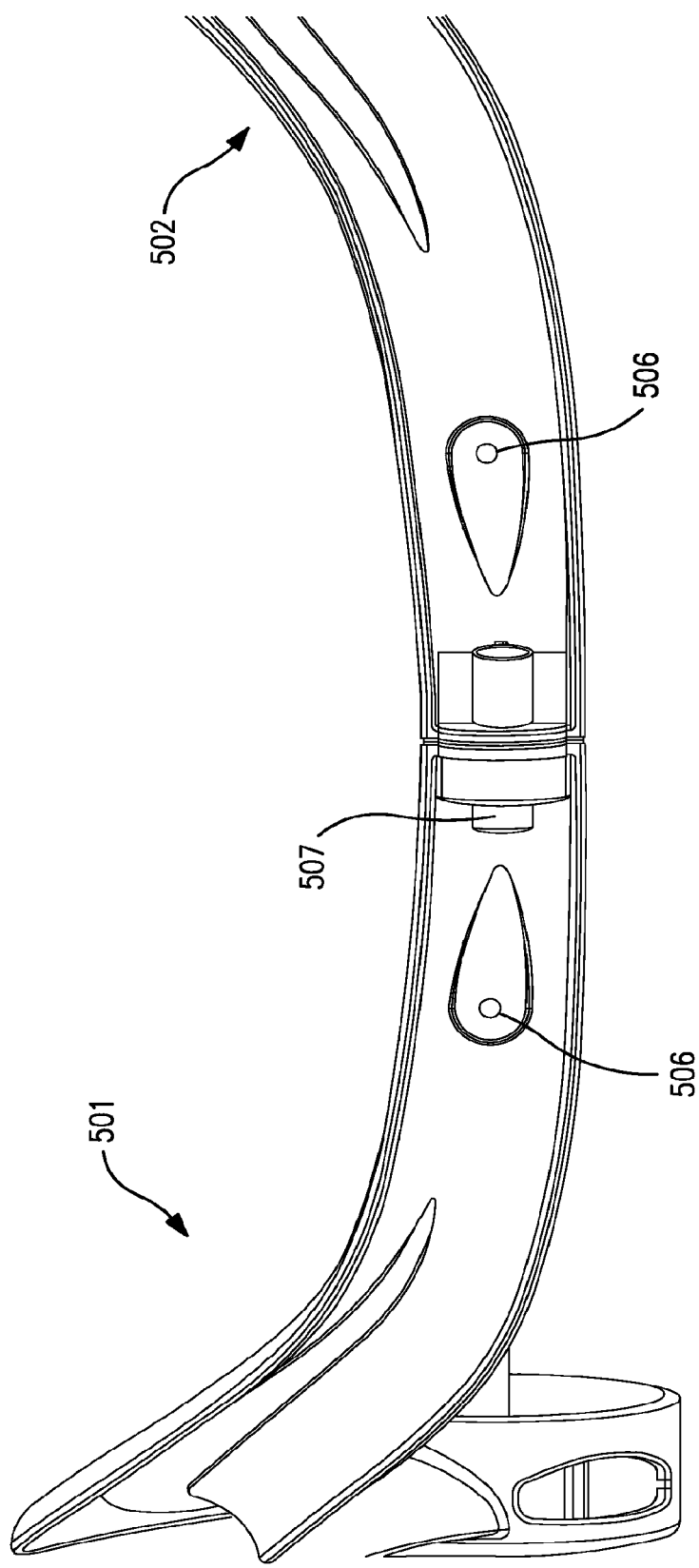
FIG. 42 shows a top view of the left handle and right handle joined together.

FIG. 42 shows a top view of the left handle 501 and right handle 502 joined together. The tab 507 is locked into the opening 509, thereby holding the parts together. The area near the handle attachment mechanism is typically where the user would hold the handle. Therefore, a cap is placed over at least this portion of the handle assembly, to protect the user's hand from the sharp edges. Fastening holes 506 are used to secure the handle cap.

Figure 43:
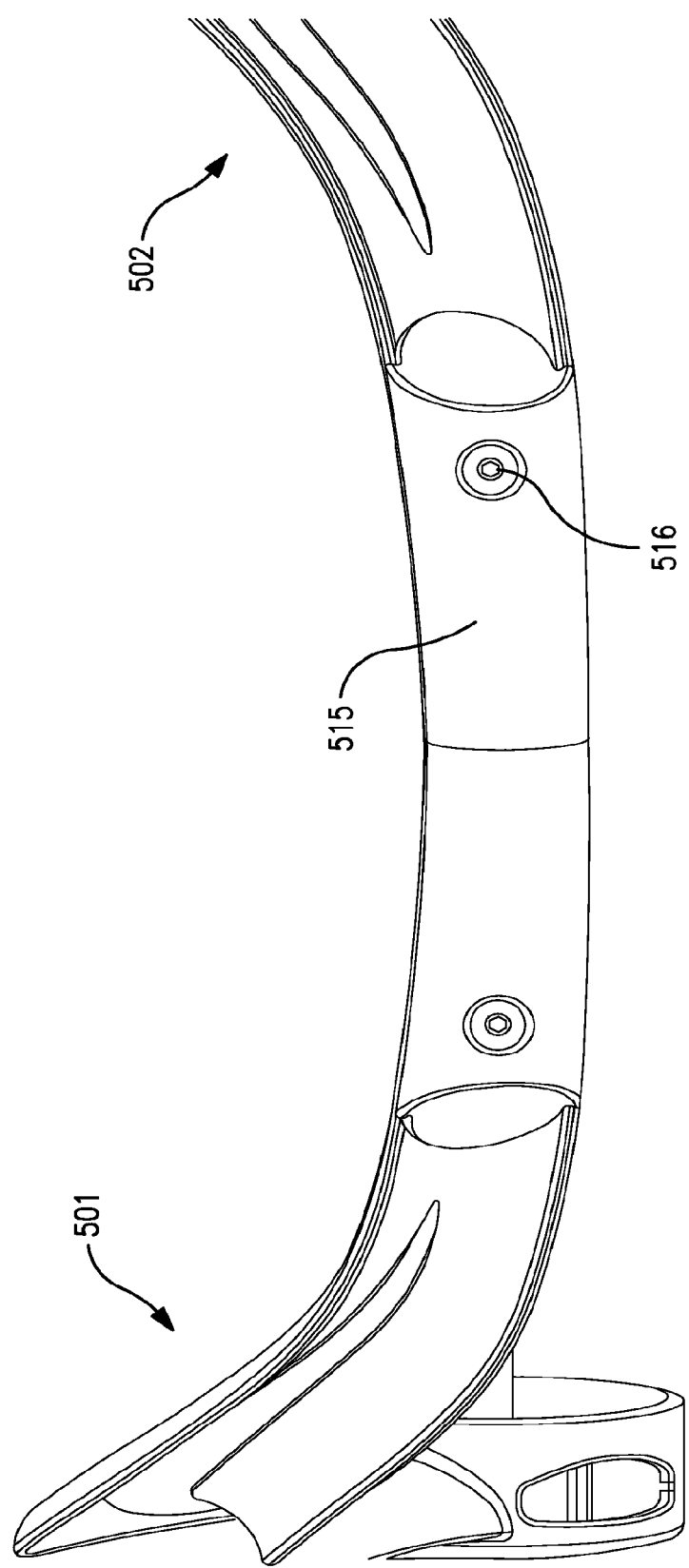
FIG. 43 shows a top view of the left handle, right handle and handle cap.

FIG. 43 shows a top view of the left handle 501, right handle 502 and handle cap 515. The holes 516 in the handle cap 515 align with the fastening holes 506 in the handles 501, 502. Screws or other fastening devices can then be used to secure the handle cap 515 to the handles.

Although the handle assembly described above is made using two parts (i.e. a left handle 501 and a right handle 502) and a handle cap, this is only one possible embodiment. In another embodiment, the handle assembly is molded as a unitary piece, which attaches at two points to the shell 450. In this embodiment, the handle cap 515 may optionally be attached to the unitary piece, to provide a more comfortable surface for the user to grasp. In other embodiments, the user grasps the unitary piece.

What is claimed is:
1. A child restraint assembly, comprising:
a base adapted to be mounted to a vehicle seat, having a hook located in a foot end of said base, projecting upward and adapted to engage with an unlocking mechanism;
a car seat removably couplable to said base; and
said unlocking mechanism carried by said car seat and operatively disposed to detach said car seat from said base, said unlocking mechanism comprising a tab biased to a first position in which said tab engages with said hook in said base, and actuatable to a second position in which said tab is rotated so as to disengage
from said hook and release said car seat from said base, and wherein said unlocking mechanism further comprises a first member biased to a first position in which radially outwardly extending members engage corresponding recesses in said base, and actuatable to a second position in which said radi- ally outwardly extending members are moved radially inwardly to disengage from said recesses and release said car seat from said base.

2. The child restraint assembly of claim 1, wherein said unlocking mechanism comprises a handle at a head end of said car seat, wherein actuation of said handle causes actuation of said tab to said second position.

3. The child restraint assembly of claim 1, wherein said tab comprises a locking portion, an elongated arm and a pivot, about which said tab rotates.

4. The child restraint assembly of claim 3, wherein said hook has a notched area, wherein said locking portion of said tab is biased in said notched area in said first position.

5. The child restraint assembly of claim 1, wherein said hook has a notched area, wherein said tab is biased in said notched area in said first position.

6. The child restraint assembly of claim 1, wherein said hook comprises an angled top portion, such that when said car seat is pressed onto said base, said tab rotates so as to slide down said angled top portion, and then is biased toward a notched region, located below said angled top portion.

7. The child restraint assembly of claim 1, wherein said unlocking mechanism comprises a ramped portion that upon attachment of said car seat to said base, engages said extending member and moves it radially outwardly.

8. The child restraint assembly of claim 1, wherein said tab comprises a locking portion, and an opening, and said hook comprises a notched region having a downward projection.

9. The child restraint assembly of claim 8, wherein, in said second position, said downward projection rests on said locking portion.

10. The child restraint assembly of claim 8, wherein, in the event of an accident, said unlocking mechanism utilizes a third position, wherein said downward projection enters said opening.

11. The child restraint assembly of claim 10, wherein said tab further comprises a turned up edge so that said hook cannot slide off said tab in the event of an accident.

12. A method of attaching and detaching a car seat to a base comprising:
utilizing a base having an upwardly projecting hook having a notched region, for connection to said car seat;
pressing said car seat onto said base, wherein said car seat comprises an unlocking mechanism carried by said car seat and comprising a tab having a locked position and an unlocked position, such that said tab rotates as said car seat in pressed onto said base, so as to allow said hook to enter said car seat, and upon full insertion, said tab is biased to rotate to said locked position, where said tab enters said notched region of said hook and wherein said unlocking mechanism further comprises a first member biased to a first position in which radially outwardly extending members engage corresponding recesses in said base, further comprising engaging said members in said recesses when pressing said car seat onto said base.

13. The method of claim 12, further comprising pulling a handle on said car seat, so as to rotate said tab to said unlocked position, where said tab is not in said notched region of said hook.

14. The method of claim 12, further comprising: pulling a handle on said car seat, such that said radially outwardly extending members are moved radially inwardly to disengage from said recesses and release said car seat from said base.

15. The method of claim 12, wherein said hook comprises a downward projection and said tab comprises an opening, further comprising, locking said base to said car seat by biasing said downward projection into said opening in the event said hook and said tab are slid relative to each other.

16. The method of claim 12, wherein said base comprises a recess, having a bottom and sloped sides, further comprising having a user press a knee into said recess and push said base downward and forward when fastening a seat belt to said base.

17. A base adapted to be mounted to a vehicle seat, configured to attach to a car seat, comprising a recessed knee-receiving area, into which the user can place their knee when tightening a vehicle's restraint system around said base, wherein said base has a front end that is closest to an edge of the vehicle seat when said base is mounted on the vehicle seat, wherein said recess comprises a bottom, an arcuate end furthest from said front end of said base, and sloped sides.

18. A child restraint assembly, comprising:
a base adapted to be mounted to a vehicle seat, having a hook located in a foot end of said base, projecting upward and adapted to engage with an unlocking mechanism;
a car seat removably couplable to said base; and said unlocking mechanism carried by said car seat and operatively disposed to detach said car seat from said base, said unlocking mechanism comprising a tab biased to a first position in which said tab engages with said hook in said base, and actuatable to a second position in which said tab is rotated so as to disengage from said hook and release said car seat from said base, wherein said tab comprises a locking portion, and an opening, and said hook comprises a notched region having a downward projection such that, in the event of an accident, said unlocking mechanism utilizes a third position, wherein said downward projection enters said opening.

19. The child restraint assembly of claim 18, wherein, in said second position, said downward projection rests on said locking portion.

20. The child restraint assembly of claim 18, wherein said tab further comprises a turned up edge so that said hook cannot slide off said tab in the event of an accident.

21. A method of attaching and detaching a car seat to a base comprising:
utilizing a base having an upwardly projecting hook having a notched region, for connection to said car seat, wherein said base a recess, having a bottom and sloped sides;
having a user press a knee into said recess and push said base downward and forward when fastening a seat belt to said base; pressing said car seat onto said base, wherein said car seat comprises an unlocking mechanism carried by said car seat and comprising a tab having a locked position and an unlocked position, such that said tab rotates as said car seat in pressed onto said base, so as to allow said hook to enter said car seat, and upon full insertion, said tab is biased to rotate to said locked position, where said tab enters said notched region of said hook.

* * * * *